(12) United States Patent
Kanzaki et al.

(10) Patent No.: US 9,162,639 B2
(45) Date of Patent: Oct. 20, 2015

(54) IN-VEHICLE ELECTRONIC CONTROL UNIT AND POWER FEEDING CONTROL METHOD OF THE SAME

(71) Applicant: Mitsubishi Electric Corporation, Chiyoda-ku, Tokyo (JP)

(72) Inventors: Shozo Kanzaki, Tokyo (JP); Koji Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 59 days.

(21) Appl. No.: 14/019,868

(22) Filed: Sep. 6, 2013

(65) Prior Publication Data

US 2014/0257632 A1    Sep. 11, 2014

(30) Foreign Application Priority Data

Mar. 5, 2013 (JP) ................................. 2013-042557

(51) Int. Cl.
*B60R 16/033* (2006.01)
*H02H 7/00* (2006.01)
*F02D 11/10* (2006.01)
*H02H 11/00* (2006.01)

(52) U.S. Cl.
CPC ............ *B60R 16/033* (2013.01); *H02H 11/003* (2013.01)

(58) Field of Classification Search
CPC ........ H02H 7/00; H02H 11/003; F02D 11/10; F02D 9/02; B60R 16/033; H02J 7/00; H02P 7/29; H02M 7/48

USPC ....................... 701/36, 86; 320/134; 307/10.1
See application file for complete search history.

(56) References Cited

U.S. PATENT DOCUMENTS

| 6,331,762 | B1 * | 12/2001 | Bertness | 320/134 |
| 8,457,859 | B2 * | 6/2013 | Drogosch et al. | 701/86 |
| 2007/0182248 | A1 * | 8/2007 | Blaker et al. | 307/10.1 |

FOREIGN PATENT DOCUMENTS

| JP | 2003-037933 A | 2/2003 |
| JP | 2007-082374 A | 3/2007 |
| JP | 2008-034051 | * 2/2008 |

* cited by examiner

*Primary Examiner* — John Q Nguyen
*Assistant Examiner* — Aaron Smith
(74) *Attorney, Agent, or Firm* — Sughrue Mion, PLLC; Richard C. Turner

(57) ABSTRACT

When a power supply switch is fed with power from a DC power supply and closed, a power supply unit starts power feeding to an opening and closing command generation unit and continues the power feeding by a self-hold command signal from the opening and closing command generation unit. A reverse connection protective element is a field-effect transistor connected in series to the power supply switch and driven to conduct current in an energization direction of an internal parasitic diode when the power supply is connected in proper polarity. Even when a supply fault abnormality is occurring due to fault contact between a positive-side wire of an in-vehicle electrical load connected to the reverse connection protective element and a positive-electrode wire of the DC power supply, the self-hold command signal is cancelled by determining that the power supply switch is opened while the reverse connection protective element is opened.

13 Claims, 8 Drawing Sheets

FIG. 3

IN-VEHICLE ELECTRONIC CONTROL UNIT AND POWER FEEDING CONTROL METHOD OF THE SAME

BACKGROUND OF THE INVENTION

1. Field of the Invention

The present invention relates to an in-vehicle electronic control unit that starts an operation when a manual power supply switch, which, for example, an ignition switch, is closed, and more particularly, to improvements of a power feeding control method in power feeding control circuitry in which a power supply switch forms a power feeding circuit for a part of in-vehicle electrical loads.

2. Description of the Background Art

In order to prevent a load current from flowing when a power supply is connected in reversed polarity by error, a technique put in wide practical use is to connect a reverse connection protective diode in series to an electrical load which is fed with power from a DC power supply. A voltage drop and a temperature rise caused by a reverse connection protective element during a normal operation are suppressed by employing a field-effect transistor as the reverse connection protective element in a broad range of applications.

The field-effect transistor referred to herein can be either a P-channel type or an N-channel type. In either case, when the power supply is in proper polarity, the field-effect transistor is driven to close so that a current flows in a direction same as an energization direction of an internal parasitic diode.

For example, according to FIG. 1 of Patent Literature 1 specified below under the title of "protective apparatus of electronic device", a protective apparatus 1 of an electronic device operating on a DC power supply is provided with a P-channel FET 3 for protection against reverse connection of the power supply. A drain of the P-channel FET 3 is connected to a power-supply terminal 2 on a positive electrode side, a source is connected to a power-supply input terminal of an electronic device 4, and a gate is connected to a grounding line.

By switching the P-channel FET 3 to an OFF state when the power supply is connected in reversed polarity and by making the ground common between a circuit 4a of the electronic device 4 and the power supply, a configuration that not only protects the circuit when the power supply is connected in reversed polarity, but is also resistant to noise can be achieved.

Regarding the terminals 2 and 2' receiving a supply of power from the unillustrated DC power supply in the protective apparatus 1, the terminal 2 is a power-supply terminal on the positive electrode side and the terminal 2' is an earth (or GND (ground)) terminal. For example, in the case of a device for vehicle, a voltage from the battery is supplied to the device when an unillustrated ignition switch is switched ON.

According to FIG. 4 of Patent Literature 2 specified below under the title of "power supply reverse connection protective circuit", an ECU 45 operating on power of a battery 3 is configured as follows. That is, an N-channel FET 21 is provided on a power supply wire 15 linking a power supply terminal 5 connected to a plus terminal of the battery 3 and a control circuit 13 to be fed with power in such a manner that an anode of its parasitic diode D1 is on the side of the power supply terminal 5. Further, an N-channel FET 22 is provided downstream of the FET 21 in such a manner that a cathode of its parasitic diode D2 is on the side of the FET 21. When an ignition key switch 9 is switched ON while the battery 3 is connected in proper polarity, the FETs 21 and 22 are switched ON by charge pump circuits 43 and 47, respectively, to which operating power is supplied from the drain side of the FET 21. Power of the battery 3 is thus supplied to the control circuit 13. Also, when the battery 3 is connected in reversed polarity, the FETs 21 and 22 are switched OFF. A reverse current is thus prevented by the parasitic diode D1.

The control circuit 13 starts an operation upon receipt of power from the battery 3 when the FET 22 is switched ON. Once the control circuit 13 starts an operation, the control circuit 13 outputs a drive signal Sd to keep the FETs 21 and 22 switched ON even when the ignition key switch 9 is switched OFF. Although it is not shown in the drawing, the control circuit 13 monitors a voltage at a signal input terminal 11 to detect ON and OFF states of the ignition key switch 9. The control circuit 13 detects that the ignition key switch 9 is switched OFF on the basis of a voltage at the signal input terminal 11. Further, when the conditions to stop the operation are satisfied later by finishing pre-processing to stop the operation, such as data saving, the control circuit 13 stops outputting the drive signal Sd.

CITATION LIST

Patent Literature

Patent Literature 1: JP-A-2003-37933 (FIG. 1, Abstract, and paragraph [0011])

Patent Literature 2: JP-A-2007-82374 (FIG. 4, Abstract, FIG. 1, and paragraphs [0056] and [0057])

According to Patent Literature 1, a P-channel field-effect transistor is employed as the reverse connection protective element. When the power supply is connected in proper polarity, a gate voltage is applied to the reverse connection protective element 3 from the unillustrated battery via the ignition switch, the parasitic diode 3a, the Zener diode 7, and the resistor 5. As a result, the reverse connection protective element 3 conducts current from the drain terminal to the source terminal and forms a power feeding path that bypasses the parasitic diode 3a.

An internal resistance between the drain and source terminals of the field-effect transistor employed as the reverse connection protective element 3 is extremely small. Hence, a voltage drop and a temperature rise of the reverse connection protective element 3 caused by connecting the reverse connection protective element 3 in series can be suppressed significantly in comparison with a case where a typical diode is employed. On the other hand, when the power supply is connected in reversed polarity by error, a gate voltage is not applied to the P-channel field-effect transistor employed as the reverse connection protective element 3 and the reverse connection protective element 3 is changed to an open-circuit state. A power-supply short circuit can be thus prevented. It should be noted that the unillustrated ignition switch is generally configured to feed power also to other unillustrated electrical loads.

Herein, assume a case where a supply fault abnormality is occurring due to an output wire of the reverse connection protective element 3 coming in fault contact with a positive-electrode wire of the battery power supply during an operation in proper polarity. In this case, there is a serious problem that even when the ignition switch is opened, not only power is fed directly to the electrical loads to which power was fed from the reverse connection protective element 3, but also power feeding to the other electrical loads continues because power cannot be prevented from flowing inversely through the reverse connection protective element 3 from a battery power supply generated by the supply fault abnormality (hereinafter, referred to as the supply-fault power supply).

Also, in a case where the electronic device 4 fed with power from the reverse connection protective element 3 is of a type that operates in response to the open and close states of the unillustrated ignition switch, there is another problem that power feeding from the supply-fault power supply to the electronic device 4 continues even when the ignition switch is opened and an operation of the electronic device 4 cannot be stopped.

These problems occur as well in a case where the reverse connection protective element 3 is not employed. When a supply fault abnormality occurs on the output side of the ignition switch, a power feeding circuit taking the place of the ignition switch is formed. This state is equivalent to a state in which the ignition switch is not opened.

According to Patent Literature 2, a P-channel field-effect transistor is employed as the reverse connection protective element 21 in FIG. 1 and FIG. 2 and an N-channel field-effect transistor is employed in FIG. 3 through FIG. 6. A power supply opening and closing element 22 controlled to open and close in response to the open and close states of the ignition key switch 9 is connected in series to the reverse connection protective element 21.

In addition, an opening and closing signal of the ignition key switch 9 is also inputted into the control circuit 13. Hence, once the ignition key switch 9 is closed, the power supply opening and closing element 22 starts to perform a self-hold operation, so that the power supply opening and closing element 22 is opened after a predetermined saving time when the ignition key switch 9 is opened.

Herein, in the event of a supply fault abnormality in the output-side wire of the power supply opening and closing element 22, power feeding to the control circuit 13 continues even when the ignition key switch 9 is opened. However, the control circuit 13 opens the power supply opening and closing element 22 when it detects that the ignition key switch 9 is opened, and thereby prevents the occurrence of inverse power feeding to the other electrical loads. It is, however, necessary to additionally provide the power supply opening and closing element 22 as a replacement of the ignition key switch 9. Hence, Patent Literature 2 is disadvantageous in that a size and the cost are increased and the electronic control unit becomes larger and expensive.

SUMMARY OF THE INVENTION

The invention was devised to solve the problems discussed above and a first object of the invention is to provide an in-vehicle electronic control unit having a reverse connection protective element connected in series to a power supply switch and configured to suppress an overdischarge of a battery while a vehicle is left unattended by suppressing a wasteful discharge of a DC power supply by detecting an open-circuit state of the power supply switch and stopping a power feeding control operation even when a supply fault abnormality is occurring due to an output wire of the reverse connection protective element coming in fault contact with a power supply line.

A second object of the invention is to provide a power feeding control method of an in-vehicle electronic control unit, which can facilitate maintenance and inspection of an in-vehicle electronic control unit having a reverse connection protective element connected in series to a power supply switch by detecting and storing the occurrence of a supply fault abnormality due to an output wire of the reverse connection protective element coming in fault contact with a power supply wire.

An in-vehicle electronic control unit according to one aspect of the invention is an in-vehicle electronic control unit, including: a load opening and closing element which is connected in series to an in-vehicle electrical load fed with power from a DC power supply; an opening and closing command generation unit which supplies an opening and closing command signal to the load opening and closing element according to a driving condition of a vehicle; and a power supply unit which feeds power to the opening and closing command generation unit by generating a predetermined stabilizing voltage when fed with power from the DC power supply in response to a manual power supply switch which is now closed, wherein the power supply switch feeds power to the in-vehicle electrical load via a reverse connection protective element. The opening and closing command generation unit generates a self-hold command signal once the power supply switch is closed and power is fed from the power supply unit, so that a power feeding operation by the power supply unit is maintained even when the power supply switch is opened. The reverse connection protective element is a field-effect transistor which includes a parasitic diode, and is configured in such a manner that a gate voltage is applied by a drive transistor so that the reverse connection protective element is driven to close in a direction same as an energization direction of the parasitic diode when the DC power supply is connected in proper polarity, whereas the reverse connection protective element does not conduct current when the DC power supply is connected in reversed polarity by error and when the power supply unit stops feeding power.

The opening and closing command generation unit receives an input of a monitor signal which is used to monitor an input-side voltage of the reverse connection protective element, which is an output voltage of the power supply switch, and to determine that the power supply switch is opened when the input-side voltage of the reverse connection protective element has a value less than a predetermined value. The opening and closing command generation unit confirms open and close states of the power supply switch even when the input-side voltage is as high as or higher than a voltage of the predetermined value by monitoring the input-side voltage while the reverse connection protective element is opened, and stops power feeding by the power supply unit by cancelling the self-hold command signal after a predetermined delay time upon detection of an open-circuit state of the power supply switch. The drive transistor is changed to an open-circuit state when the power feeding by the power supply unit stops and the reverse connection protective element is changed to an open-circuit state even when a supply fault abnormality is occurring due to fault contact between an output wire of the reverse connection protective element and a positive-electrode wire of the DC power supply, so that the power supply unit is not started again while the power supply switch is opened.

A power feeding control method of an in-vehicle electronic control unit according to another aspect of the invention is a power feeding control method of an in-vehicle electronic control unit including: a load opening and closing element which is connected in series to an in-vehicle electrical load fed with power from a DC power supply; an opening and closing command generation unit which supplies an opening and closing command signal to the load opening and closing element according to a driving condition of a vehicle; and a power supply unit which feeds power to the opening and closing command generation unit by generating a predetermined stabilizing voltage when fed with power from the DC power supply in response to a manual power supply switch which is now closed, and configured in such a manner that the power supply switch feeds power to the in-vehicle electrical load via a reverse connection protective element. A gate voltage is applied by a drive transistor to the reverse connection protective element which is a field-effect transistor including a parasitic diode when the DC power supply is connected in proper polarity so that the reverse connection protective element is driven to close in a direction same as an energization direction of the parasitic diode, whereas the reverse connection protective element does not conduct current when the DC power supply is connected in reversed polarity by error and when the power supply unit stops feeding power.

The opening and closing command generation unit includes a RAM memory, a non-volatile program memory, a non-volatile data memory which is a partial region of the non-volatile program memory or a separate memory connected thereto, and a microprocessor operating in cooperation with a multi-channel A-to-D converter. The microprocessor generates a self-hold command signal once the power supply switch is closed and power is fed from the power supply unit, so that a power feeding operation by the power supply unit is maintained even when the power supply switch is opened. The microprocessor periodically monitors whether the power supply switch is still closed. The microprocessor determines that the power supply switch is opened when an input-side voltage of the reverse connection protective element is not generated at least while the reverse connection protective element is opened and stops the power feeding operation by the power supply unit by cancelling the self-hold command signal after a predetermined delay and stand-by period. The microprocessor determines that a supply fault abnormality is occurring due to fault contact between an output wire of the reverse connection protective element and a positive-electrode wire of the DC power supply when an output-side voltage of the reverse connection protective element is generated but the input-side voltage is not and saves at least abnormality occurrence history information by writing the abnormality occurrence history information in the non-volatile data memory in the delay and stand-by period.

The in-vehicle electronic control unit configured as above includes the reverse connection protective element connected in series to an electrical load fed with power from the DC power supply via the power supply switch. Power is fed to the opening and closing command generation unit which controls the reverse connection protective element to open and close from the power supply unit to which power is fed by self-hold power feeding once the power supply switch is closed, and power feeding is stopped after a predetermined delay time when the power supply switch is opened. Even when the input-side voltage of the reverse connection protective element is generated, the opening and closing command generation unit cancels the self-hold command signal when interruption of the power supply switch is confirmed by interrupting the reverse connection protective element once and maintains the reverse connection protective element in an open-circuit state.

Hence, even when a supply fault abnormality is occurring due to the output wire of the reverse connection protective element coming in fault contact with the power supply line, the power feeding control operation is stopped by preventing power from flowing from the output side to the input side of the reverse connection protective element and by detecting an open-circuit state of the power supply switch. Also, the power supply unit is not started again by the power supply on the supply fault side unless the power supply switch is closed again. Hence, there can be achieved an advantage that an overdischarge of the battery while the vehicle is left unattended can be suppressed by suppressing a wasteful discharge of the DC power supply.

In a case where it is configured in such a manner that the power supply switch feeds power also to another combination control device, sneak power feeding from the supply-fault power supply to the combination control device can be prevented. Hence, there can be achieved an advantage that the reverse connection protective element can exert more than one function: a function of preventing the occurrence of a power-supply short circuit against the DC power supply connected in reversed polarity, and a function of preventing sneak power feeding against a supply fault abnormality.

In a case where the reverse connection protective element is a P-channel field-effect transistor which does not require a gate driving boost circuit, when a supply fault abnormality occurs on the output side of the reverse connection protective element, the reverse connection protective element conducts current in a forward direction which is inverse to a conduction direction of the internal parasitic diode. This conduction raises a problem that an open-circuit state of the power supply switch cannot be detected. However, the opening and closing command generation unit solves this problem by generating an open-circuit command to the reverse connection protective element. The same applies to a case where the reverse connection protective element is an N-channel field-effect transistor provided with a gate driving boost circuit.

According to the power feeding control method of an in-vehicle electronic control unit configured as above, in an in-vehicle electronic control unit of a type including the reverse connection protective element which is connected in series to an electrical load fed with power from the DC power supply via the power supply switch, and configured in such a manner that power is fed to the opening and closing command generation unit which controls the reverse connection protective element to open and close from the power supply unit to which power is fed by self-hold power feeding once the power supply switch is closed and power feeding is stopped after a predetermined delay and stand-by period when the power supply switch is opened, even when the input-side voltage of the reverse connection protective element is generated, the self-hold command signal is cancelled when interruption of the power supply switch is confirmed by opening the reverse connection protective element and the reverse connection protective element is maintained in an open-circuit state. In a case where the output voltage of the reverse connection protective element is generated but the input-side voltage is not when the reverse connection protective element is opened, it is determined that a supply fault abnormality is occurring and an abnormality history is saved.

Hence, even when a supply fault abnormality is occurring due to the output wire of the reverse connection protective element coming in fault contact with the power supply line, the power feeding control operation is stopped by preventing power from flowing from the output side to the input side of the reverse connection protective element and by detecting an open-circuit state of the power supply switch. In addition, the power supply unit is not started again by the power supply on the supply fault side unless the power supply switch is closed again. Hence, there can be achieved an advantage that safety while the vehicle is left unattended can be enhanced by suppressing a wasteful discharge of the DC power supply.

Also, the supply fault abnormality occurrence information detected during the delay and stand-by period as short as a time since the power supply switch is interrupted until the self-hold power feeding is stopped is written and saved in the non-volatile data memory before the self-hold power feeding is stopped. Hence, there can be achieved an advantage that maintenance and inspection can be performed exactly by reading out the saved data.

The foregoing and other objects features, aspects, and advantages of the present invention will become more apparent from the following detailed description of the present invention when taken conjunction with the accompanying drawings.

BRIEF DESCRIPTION OF THE DRAWINGS

FIG. 3 is an overall circuit diagram of an in-vehicle electronic control unit according to a second embodiment of the invention;

DETAILED DESCRIPTION OF THE PREFERRED EMBODIMENTS OF THE INVENTION

First Embodiment

Figure 1:
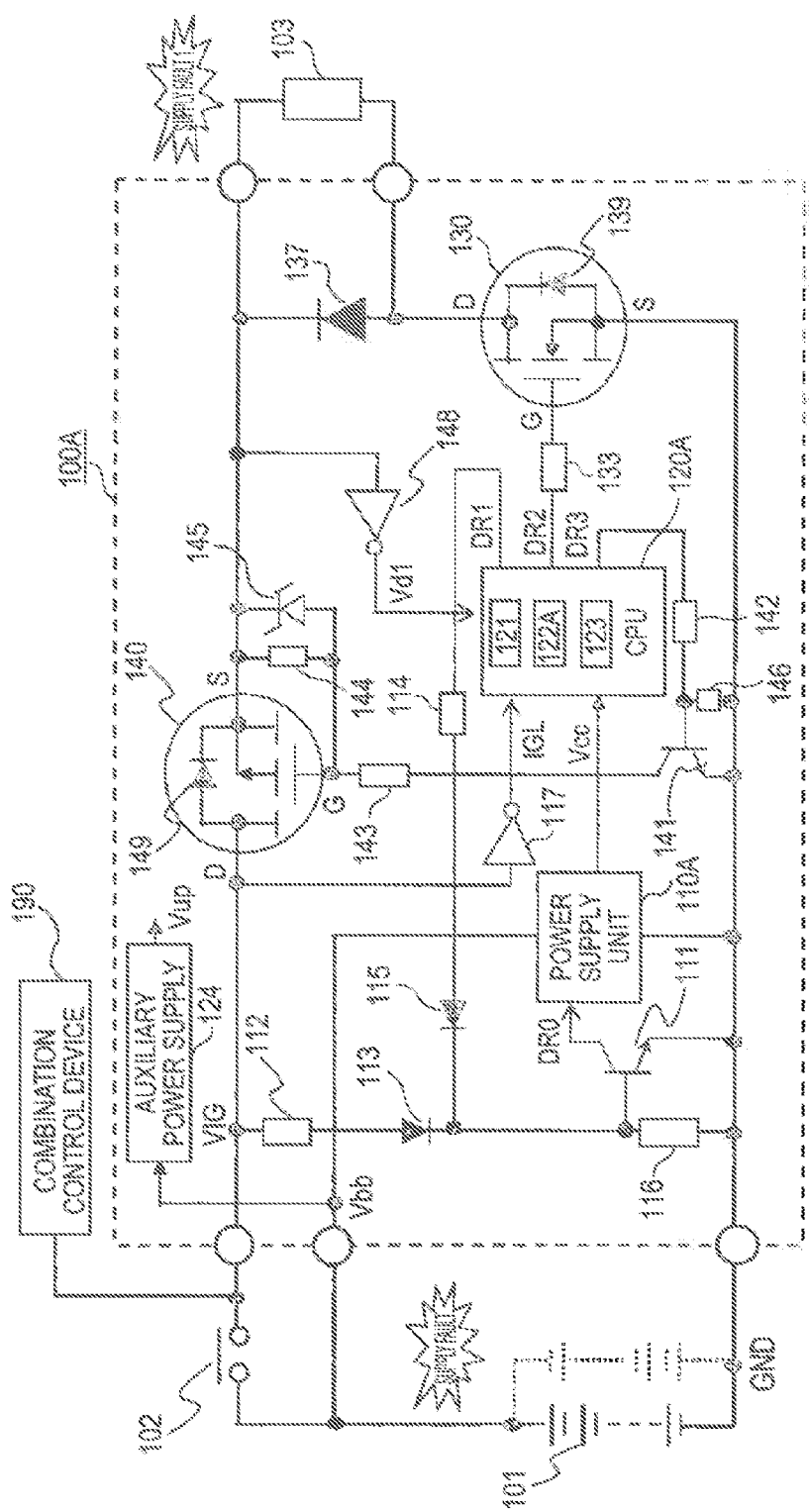
FIG. 1 is an overall circuit diagram of an in-vehicle electronic control unit according to a first embodiment of the invention.

Hereinafter, with reference to FIG. 1 showing an overall circuit diagram of an in-vehicle electronic control unit according to a first embodiment of the invention, a configuration will be described in detail.

Referring to FIG. 1, an in-vehicle electronic control unit 100A includes a main power supply terminal which is directly connected to a positive-electrode terminal of a DC power supply 101 that is an in-vehicle battery and therefore to which a main power supply voltage Vbb is applied, a ground terminal which is connected to a ground circuit GND that is a vehicle body to which a negative-electrode terminal of the DC power supply 101 is connected, a power supply terminal which is connected to the positive-electrode terminal of the DC power supply 101 via a manual power supply switch 102 that is, for example, an ignition switch, and therefore to which an input-side voltage VIG is applied, and a load connection terminal to which is connected an in-vehicle electrical load 103 which is one of in-vehicle electrical load groups.

In a case where the in-vehicle electronic control unit 100A is, for example, an engine control unit, the in-vehicle electrical load groups controlled by the in-vehicle electronic control unit 100A include electromagnetic valves for fuel injection, a throttle valve opening control motor, ignition coils (in the case of a gasoline engine), and the like. Power is divided and fed to apart of a large number of the in-vehicle electrical load groups from the DC power supply 101 via an output contact of an unillustrated electromagnetic relay for load power supply. The in-vehicle electrical loads fed with divided power are placed under energization control by an unillustrated control opening and closing element provided in the in-vehicle electronic control unit 100A. In addition, the power supply switch 102 feeds power also to a combination control device 190 which is, for example, a transmission control apparatus.

A power supply unit 110A is provided inside the in-vehicle electronic control unit 100A and the main power supply voltage Vbb is applied to the power supply unit 110A from the DC power supply 101. Upon supply of a power supply start-up signal DR0, the power supply unit 110A feeds power to an opening and closing command generation unit 120A by generating a control voltage Vcc, which is a predetermined stabilizing voltage, for example, of DC 5 V. The power supply unit 110A is formed of a constant-voltage control circuit using, for example, a junction-type transistor. A base circuit is configured in such a manner that when the DC power supply 101 is connected in reversed polarity indicated by a dotted line by error, the junction-type transistor ceases conduction and no longer generates the control voltage Vcc.

A start-up transistor 111 which supplies the power supply start-up signal DR0 to the power supply unit 110A is an NPN transistor which conducts current when supplied with a base current by a series circuit made up of a first drive resistor 112 and a first diode 113 when the power supply switch 102 is closed. When a logic level of a self-hold command signal DR1 generated by the opening and closing command generation unit 120A shifts to "H", a base current is supplied to the start-up transistor 111 by a series circuit made up of a second drive resistor 114 and a second diode 115. Hence, once the opening and closing command generation unit 120A starts an operation, the power supply start-up signal DR0 is held effective even when the power supply switch 102 is opened.

When the power supply switch 102 is opened and the self-hold command signal DR1 takes a logic level "L", the start-up transistor 111 is opened in a reliable manner by an open-circuit stabilizing resistor 116 connected between the base terminal and the emitter terminal. A monitor element 117 which is an invert logical element generates a voltage monitor signal IGL which shifts to a logic level "L" when the power supply switch 102 is closed and inputs this signal into the opening and closing command generation unit 120A.

The opening and closing command generation unit 120A includes a RAM memory 121, a non-volatile program memory 122A, an unillustrated non-volatile data memory which is a partial region of the non-volatile program memory 122A or a separate memory connected thereto, and a microprocessor which operates in cooperation with a multi-channel A-to-D converter 123.

The RAM memory 121 is fed with power from an auxiliary power supply 124 which is fed with power from the main power supply voltage Vbb and generates a stabilizing voltage Vup, for example, of DC 2.8 V. The RAM memory 121 can therefore hold a memory content even in a state where the power supply switch 102 is opened and the power supply unit 110A stops an output.

In order to prevent a loss of important data, such as learning memory information, abnormality occurrence history information, or information on time-dependent characteristic change of various sensors, written into the RAM memory 121 when an abnormal voltage drop occurs in the DC power supply 101 which is the in-vehicle battery or when the power supply terminal is opened for battery replacement, the self-hold command signal DR1 is cancelled after the important data is transferred to and saved in the non-volatile data memory within a predetermined time immediately after the power supply switch 102 is opened and the microprocessor stops by itself after it canceled the self-hold command signal DR1.

Alternatively, it may be configured in the following manner. That is, a signal cycle of a watchdog pulse generated by the microprocessor is monitored by an unillustrated watchdog timer and the watchdog timer generates the self-hold command signal DR1 while the microprocessor operates normally. The self-hold command signal DR1 is cancelled when the microprocessor automatically stops after the microprocessor recognizes that the power supply switch 102 is opened on the basis of the voltage monitor signal IGL and transfers and saves the data into the non-volatile data memory.

The load opening and closing element 130 is, for example, an N-channel field-effect transistor connected in series to the in-vehicle electrical load 103 on a lower stream side. A signal voltage by an opening and closing command signal DR2 generated by the opening and closing command generation unit 120A is supplied between the gate terminal G and the source terminal S via a drive resistor 133. When the logic level of the opening and closing command signal DR2 shifts to "H", the load opening and closing element 130 conducts current between the drain terminal D and the source terminal S in a forward direction.

When the logic level of the opening and closing command signal DR2 shifts to "L", conduction between the drain terminal D and the source terminal S of the load opening and closing element 130 is interrupted, so that an exciting current flowing to the in-vehicle electrical load 103 is diverted to a freewheel diode 137 connected in parallel with the in-vehicle electrical load 103. The load opening and closing element 130 can be an NPN junction-type transistor. However, when a field-effect transistor is used, there is an advantage that a voltage drop between elements during a close-circuit state becomes extremely small and a loss of power can be suppressed.

It should be noted, however, that in a case where the field-effect transistor is used, because a parasitic diode 139 is formed between the drain terminal D and the source terminal S in a direction indicated in the drawing, the load opening and closing element 130 is not furnished with an interruption function as an opening and closing element in a conduction direction of the parasitic diode 139.

A reverse connection protective element 140 which is a P-channel field-effect transistor is connected in series to the in-vehicle electrical load 103 on an upper stream side. The reverse connection protective element 140 is configured so as to conduct current in a direction inverse to a direction of a normal opening and closing element, so that the drain terminal D is on the power supply side and the source terminal S is on the load side.

A series circuit made up of a drive transistor 141 and a drive resistor 143 is connected between the gate terminal G of the reverse connection protective element 140 and the ground circuit GND. The drive transistor 141 which is an NPN transistor is driven to energize via a base resistor 142 when an energization command signal DR3 generated by the opening and closing command generation unit 120A takes a logic level "H". Energization of the drive transistor 141 is stopped by an open-circuit stabilizing resistor 146 connected between the base terminal and the emitter terminal of the drive transistor 141 when the energization command signal DR3 takes a logic level "L" or the opening and closing command generation unit 120A stops an operation because power feeding to the opening and closing command generation unit 120A is stopped.

A gate resistor 144 and a constant voltage diode 145 are connected in parallel between the source terminal S and the gate terminal G of the reverse connection protective element 140. The constant voltage diode 145 provides overvoltage protection so that a gate voltage applied between the source terminal S and the gate terminal G of the reverse connection protective element 140 does not exceed a predetermined limit voltage.

To a monitor element 148 which is an invert logical element, the input-side voltage VIG is inputted as a logic signal via a parasitic diode 149 in the reverse connection protective element 140 when the power supply switch 102 is closed. As a result, the monitor element 148 generates a power feeding monitor signal Vd1 taking a logic level "L" and inputs this signal into the opening and closing command generation unit 120A.

The reverse connection protective element 140 which is a P-channel field-effect transistor conducts current between the drain terminal D and the source terminal S when a predetermined gate voltage of a polarity in which potential at the gate terminal G becomes lower than potential at the source terminal S is applied. A conduction direction is such that a current flows between the drain terminal D and the source terminal S in a direction from whichever has the higher potential to the other having the lower potential.

When the gate voltage drops to or below a predetermined value, conduction between the drain terminal D and the source terminal S is interrupted. However, because the parasitic diode 149 is in a parallel connection state between the drain terminal D and the source terminal S, a current in a direction from the drain terminal D to the source terminal S cannot be interrupted.

On the contrary, the load opening and closing element 130 which is an N-channel field-effect transistor conducts current between the drain terminal D and the source terminal S when a predetermined gate voltage of a polarity in which potential at the gate terminal G becomes higher than potential at the source terminal S is applied. A conduction direction is such that a current flows between the drain terminal D and the source terminal S in a direction from whichever has the higher potential to the other having the lower potential. When the gate voltage drops to or below a predetermined value, conduction between the drain terminal D and the source terminal S is interrupted. However, because the parasitic diode 139 is in a parallel connection state between the drain terminal D and the source terminal S, a current in a direction from the source terminal S to the drain terminal D cannot be interrupted.

A function and an operation of the in-vehicle electronic control unit according to the first embodiment of the invention configured as in FIG. 1 will now be described in detail with reference to a flowchart shown in FIG. 2 used to describe an operation.

Firstly, referring to FIG. 1, an input-side voltage VIG is applied when the power supply switch 102 is closed and a base current of the start-up transistor 111 is supplied via the first drive resistor 112 and the first diode 113. The start-up transistor 111 thus generates a power supply start-up signal DR0 and the power supply unit 110A starts an operation. The power supply unit 110A feeds power to the opening and closing command generation unit 120A by generating a control voltage Vcc from the main power supply voltage Vbb.

As a result, the microprocessor in the opening and closing command generation unit 120A starts an operation. The opening and closing command generation unit 120A recognizes that the power supply switch 102 is closed on the basis of a voltage monitor signal IGL which is an output signal of the monitor element 117 and starts a control operation described below with reference to FIG. 2. In starting the control operation, the opening and closing command generation unit 120A generates a self-hold command signal DR1 to maintain an operation state of the start-up transistor 111 via the second drive resistor 114 and the second diode 115 and also generates an energization command signal DR3 to drive the drive transistor 141 to close.

When the power supply switch 102 and the drive transistor 141 are closed, the input-side voltage VIG is supplied to a series circuit made up of the gate resistor 144 and the drive resistor 143 via the parasitic diode 149 in the reverse connection protective element 140. The reverse connection protective element 140 starts energization in a direction from the drain terminal D on the input side to the source terminal S on the output side by a gate voltage which is a voltage across the gate resistor 144. The reverse connection protective element 140 is thus in a condition that power can be fed to the in-vehicle electrical load 103. Herein, by shifting the logic level of the opening and closing command signal DR2 to "H" or "L", the load opening and closing element 130 conducts current or ceases to conduct current. Hence, a power feeding state to the in-vehicle electrical load 103 can be controlled.

In a case where there is more than one in-vehicle electrical load 103, the opening and closing command generation unit 120A supplies an opening and closing command signal to each of the load opening and closing elements connected in series to the respective in-vehicle electrical loads. While the opening and closing command generation unit 120A is in operation, a plurality of the in-vehicle electrical loads are driven under control and learning memory information on an operating state, information on time-dependent changes of detection characteristics of an unillustrated input sensor, or abnormality occurrence history information is written into the RAM memory 121 as needed.

When the power supply switch 102 is opened in this state, the opening and closing command generation unit 120A recognizes the opening on the basis of the voltage monitor signal IGL and cancels the self-hold command signal DR1 after important information written into the RAM memory 121 is transferred to and written in the unillustrated non-volatile data memory or a particular region of the program memory 122A. As a result, the start-up transistor 111 is opened and the power supply unit 110A becomes inoperable. Power feeding to the opening and closing command generation unit 120A is thus stopped.

On the other hand, in a case where the power supply switch 102 is closed after the DC power supply 101 is connected in reversed polarity as is indicated by a dotted line of FIG. 1 by error, the power supply unit 110A itself is protected by the internal circuit configuration and does not generate a control voltage Vcc. A gate voltage below a voltage at the source terminal S is not applied to the gate terminal G of the reverse connection protective element 140, either. Hence, because the reverse connection protective element 140 is in a non-conducting state, a power-supply short circuit current by a series circuit made up of the parasitic diode 139 in the load opening and closing element 130 and the freewheel diode 137 is prevented from flowing.

In the event of a supply fault abnormality due to a positive-side wire of the in-vehicle electrical load 103, which is an output wire of the reverse connection protective element 140, coming in fault contact with a positive-electrode wire of the DC power supply 101 when the opening and closing command generation unit 120A is in normal operation in a state where the DC power supply 101 is connected in proper polarity and the power supply switch 102 is closed, the reverse connection protective element 140 maintains a close-circuit state even when the power supply switch 102 is opened later. The supply-fault power supply therefore feeds power to the combination control apparatus 190 by sneaking in an inverse direction from the source terminal S to the drain terminal D of the reverse connection protective element 140. Also, the monitor element 117 can no longer recognize that the power supply switch 102 is opened. The opening and closing command generation unit 120A thus maintains an operating state.

To avoid this problem, the opening and closing command generation unit 120A of the first embodiment recognizes whether the power supply switch 102 is opened by monitoring the voltage monitor signal IGL while the reverse connection protective element 140 is opened by periodically stopping the energization command signal DR3 for a moment to open the reverse connection protective element 140. When it is recognized that the power supply switch 102 is opened, the opening and closing command generation unit 120A stops the self-hold command signal DR1 after a predetermined saving time (delay time).

In a case where the power feeding monitor signal Vd1 of the monitor element 148 detects an output-side voltage of the reverse connection protective element 140 when it is recognized that the power supply switch 102 is opened on the basis of the voltage monitor signal IGL by opening the reverse connection protective element 140, it is determined that a supply fault abnormality is occurring. Hence, the opening and closing command generation unit 120A stops the self-hold command signal DR1 after the abnormality occurrence history information is transferred to and saved in the unillustrated non-volatile data memory or a partial region of the program memory 122A.

Even when a supply fault abnormality occurs in the output wire of the reverse connection protective element 140 while the power supply switch 102 is opened, because the drive transistor 141 is in a non-conducting state, the reverse connection protective element 140 is in an open-circuit state. The fault-supply power supply therefore does not flow inversely to the input side of the reverse connection protective element 140.

Figure 2:
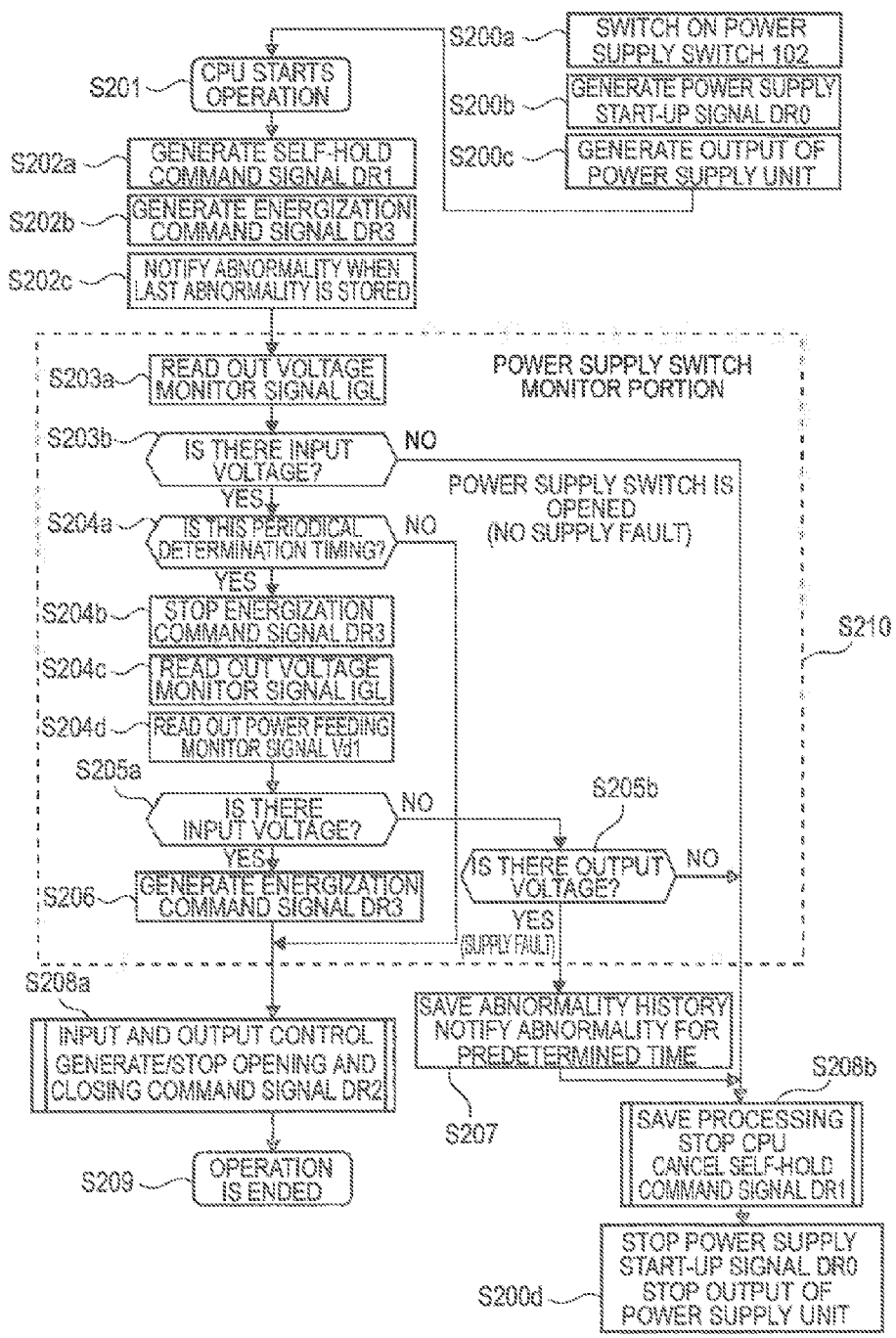
FIG. 2 is a view showing a flowchart used to describe an operation by the overall circuit diagram of FIG. 1.

FIG. 2 showing a flowchart used to describe an operation by the circuit configuration of FIG. 1 will now be described.

Referring to FIG. 2, Step S200a is a step in which the power supply switch 102 is closed and thereby switched ON in the opening and closing command generation unit 120A connected as in FIG. 1. Subsequent Step S200b is a step in which the start-up transistor 111 generates a power supply start-up signal DR0 as the power supply switch 102 is closed. Subsequent Step S200c is a step in which, because the power supply start-up signal DR0 is generated, the power supply unit 110A feeds power to the opening and closing command generation unit 120A by generating a control voltage Vcc.

Subsequent Step S201 is a step in which the microprocessor is started as power is fed to the opening and closing command generation unit 120A and opening and closing control of the load opening and closing element 130 connected in series to the electrical load group (s) is started according to a content of the control program stored in the program memory 122A and in response to an operating state of an unillustrated input signal.

Subsequent Step S202a is a step in which the self-hold command signal DR1 for the start-up transistor 111 is generated so that a conducting state of the start-up transistor 111 is maintained even when the power supply switch 102 is opened. Subsequent Step S202b is a step in which the energization command signal DR3 for the drive transistor 141 is generated to drive the reverse connection protective element 140 to close. Subsequent Step S202c is a step in which a content of the non-volatile data memory is read out and an abnormality is notified in a case where a supply fault abnormality had occurred when the operation was stopped last time.

Subsequent Step S203a is a step from which advancement is made to Step S203b after a logic state of the voltage monitor signal IGL is read out. Step S203b is a determination step in which a determination is made as to whether the input-side voltage VIG is generated on the basis of the logic state of the voltage monitor signal IGL. When the voltage monitor signal IGL takes a logic level "L", the presence of the input-side voltage VIG is determined and advancement is made to Step S204a by making a determination of YES. When the voltage monitor signal IGL takes a logic level "H", the absence of the input-side voltage VIG is determined and advancement is made to Step Block S208b by making a determination of NO.

Step S204a is a determination step from which advancement is made to Step S204b by making a determination of YES periodically, for example, once in every second cycle of 100 msec and otherwise advancement is normally made to Step Block S208a by making a determination of NO. Step S204a is performed repetitively in a cycle which is, for example, a first cycle of 10 msec or shorter.

Step S204b is a step in which the reverse connection protective element 140 is opened by stopping the energization command signal DR3 generated in Step S202b. Subsequent Step S204c is a step from which advancement is made to Step S204d after a logic state of the voltage monitor signal IGL is read out. Step S204d is a step from which advancement is made to Step S205a after a logic state of the power feeding monitor signal Vd1 is read out. Step S205a is a determination step in which a determination is made as to whether the input-side voltage VIG is generated on the basis of the logic state of the voltage monitor signal IGL read out in Step S204c. When the voltage monitor signal IGL takes a logic level "L", the presence of the input-side voltage VIG is determined and advancement is made to Step S206 by making a determination of YES. When the voltage monitor signal IGL takes a logic level "H", the absence of the input-side voltage VIG is determined, and advancement is made to Step S205b by making a determination of NO.

Step S205b is a determination step in which a determination is made as to whether an output-side voltage of the reverse connection protective element 140 is generated on the basis of the logic state of the power feeding monitor signal Vd1 read out in Step S204d. When the power feeding monitor signal Vd1 takes a logic level "L", the presence of the output-side voltage is determined and advancement is made to Step S207 by making a determination of YES. When the power feeding monitor signal Vd1 takes a logic level "H", the absence of the output-side voltage is determined and advancement is made to Step Block 208b by making a determination of NO.

A determination of YES is made in Step S205a in a case where a close-circuit state of the power supply switch 102 is continuing. The energization command signal DR3 stopped in Step S204b is generated again in Step S206, according to which signal the reverse connection protective element 140 is driven to close. A period from Step S204b to Step S206 is a partial period of the entire period circulating from operation starting Step S201 to operation ending Step S209. Hence, a time over which to open the reverse connection protective element 140 is limited to an extremely short period.

A determination of YES is made in Step S205b in a state where the output-side voltage of the reverse connection protective element 140 is generated in the absence of the input-side voltage, that is, when a supply fault abnormality is occurring. Hence, supply fault abnormality occurrence information is written into the RAM memory 121 in Step S207 and advancement is made to Step Block S208b after the abnormality is notified for a predetermined time.

Step Block S208a is an input and output control block during normal operation in which the opening and closing command signal DR2 for the load opening and closing element 130 is generated or stopped. Advancement is made from Step Block S208a to operation ending Step S209. Operation ending Step S209 is a step in which return is made to operation starting Step S201 after a cycle time, for example, of 10 msec at the latest since the other control programs were performed, so that Step S201 and subsequent steps are repetitively performed.

In Step Block S208b performed when a determination of NO is made in Step S203b or Step S205b, that is, in a state where it is determined that the power supply switch 102 is opened, the self-hold command signal DR1 is cancelled after learning information and abnormality occurrence information written into the RAM memory 121 are transferred to and saved in the non-volatile data memory. In subsequent Step S200d, the power supply start-up signal DR0 is stopped so that an operation of the power supply unit 110A is stopped.

Step Block 5210 made up of Step S203a through Step S206 forms a power supply switch monitor portion. The content shown in Step Block 5210 can be created by hardware using a logical element without depending on the microprocessor.

Gist and Characteristic of First Embodiment

As can be obvious from the description above, the in-vehicle electronic control unit 100A according to the first embodiment of the invention includes: the load opening and closing element 130 which is connected in series to a part or all of in-vehicle electrical load groups fed with power from the DC power supply 101; the opening and closing command generation unit 120A which supplies an opening and closing command signal DR2 to the load opening and closing element 130 according to a driving condition of a vehicle; and the power supply unit 110A which feeds power to the opening and closing command generation unit 120A by generating a predetermined stabilizing voltage when fed with power from the DC power supply 101 in response to the manual power supply switch 102 which is now closed, wherein the power supply switch 102 feeds power to the in-vehicle electrical load 103 which is the part or all of the in-vehicle electrical load groups via the reverse connection protective element 140. The opening and closing command generation unit 120A generates a self-hold command signal DR1 once the power supply switch 102 is closed and power is fed from the power supply unit 110A, so that a power feeding operation by the power supply unit 110A is maintained even when the power supply switch 102 is opened. The reverse connection protective element 140 is a field-effect transistor which includes the parasitic diode 149, and is configured in such a manner that a gate voltage is applied by the drive transistor 141 so that the reverse connection protective element 140 is driven to close in a direction same as an energization direction of the parasitic diode 149 when the DC power supply 101 is connected in proper polarity, whereas the reverse connection protective element 140 does not conduct current when the DC power supply 101 is connected in reversed polarity by error and when the power supply unit 110A stops feeding power.

The opening and closing command generation unit 120A receives an input of a monitor signal IGL which is used to monitor the input-side voltage VIG of the reverse connection protective element 140, which is an output voltage of the power supply switch 102, and to determine that the power supply switch 102 is opened when the input-side voltage VIG of the reverse connection protective element 140 has a value less than a predetermined value. The opening and closing command generation unit 120A confirms the open and close states of the power supply switch 102 even when the input-side voltage VIG is as high as or higher than a voltage of the predetermined value by monitoring the input-side voltage VIG while the reverse connection protective element 140 is opened, and stops power feeding by the power supply unit 110A by cancelling the self-hold command signal DR1 after a predetermined delay time upon detection of an open-circuit state of the power supply switch 102. The drive transistor 141 is changed to an open-circuit state when the power feeding by the power supply unit 110A stops and the reverse connection protective element 140 is changed to an open-circuit state even when a supply fault abnormality is occurring due to fault contact between an output wire of the reverse connection protective element 140 and a positive-electrode wire of the DC power supply 101, so that the power supply unit 110A is not started again while the power supply switch 102 is opened.

The opening and closing command generation unit 120A monitors whether the power supply switch 102 is closed, constantly or periodically, for example, in a high-frequency first cycle and determines whether the power supply switch 102 is opened by periodically opening the reverse connection protective element 140 in a low frequency second cycle, so that the opening and closing command generation unit 120A drives the reverse connection protective element 140 to close immediately when the power supply switch 102 is closed.

As has been described, in conjunction with claim 2 of the invention, the opening and closing command generation unit detects whether the power supply switch is opened by periodically opening the reverse connection protective element for a moment. Even when the reverse connection protective element is opened, power feeding to the electrical load is continued by the parasitic diode while the power supply switch is closed, and the reverse connection protective element is closed immediately. Hence, there is a characteristic that a temperature rise of the parasitic diode can be suppressed. Also, because the open and close states of the power supply switch are monitored constantly or with a high frequency, an open-circuit state can be detected immediately when a supply fault abnormality is not occurring. Even when a supply fault abnormality is occurring, an open-circuit state of the power supply switch can be detected without a delay by periodically opening the reverse connection protective element.

The opening and closing command generation unit 120A receives an input of a power feeding monitor signal Vd1 which is a logic signal used to monitor an output voltage of the reverse connection protective element 140. The opening and closing command generation unit 120A compares, when it generates an open-circuit command for the reverse connection protective element 140, logic states of a voltage monitor signal IGL which is a logic signal used to monitor the input-side voltage VIG and the power feeding monitor signal Vd1 and determines that a supply fault abnormality is occurring when the output-side voltage of the reverse connection protective element 140 is detected but the input-side voltage VIG is not.

As has been described, in conjunction with claim 3 of the invention, the opening and closing command generation unit periodically opens the reverse connection protective element and determines that the power supply switch is opened when a voltage is absent on the input side of the reverse connection protective element, and determines that a supply fault abnormality is occurring when a voltage is present on the output side in this instance. Hence, there is a characteristic that whether or not a supply fault abnormality is occurring in the output wire is logically determined with ease in a period during which the power supply switch is interrupted and power is fed to the opening and closing command generation unit with a delay.

As can be obvious from the description above, the power feeding control method of an in-vehicle electronic control unit according to the first embodiment of the invention is the power feeding control method of the in-vehicle electronic control unit 100A. The in-vehicle electronic control unit 100A includes: the load opening and closing element 130 which is connected in series to a part or all of in-vehicle electrical load groups fed with power from the DC power supply 101; the opening and closing command generation unit 120A which supplies an opening and closing command signal DR2 to the load opening and closing element 130 according to a driving condition of a vehicle; and the power supply unit 110A which feeds power to the opening and closing command generation unit 120A by generating a predetermined stabilizing voltage when fed with power from the DC power supply 101 in response to the manual power supply switch 102 which is now closed, and configured in such a manner that the power supply switch 102 feeds power to the in-vehicle electrical load 103 which is the part or all of the in-vehicle electrical load groups via the reverse connection protective element 140. A gate voltage is applied by the drive transistor 141 to the reverse connection protective element 140 which is a field-effect transistor including the parasitic diode 149 when the DC power supply 101 is connected in proper polarity so that the reverse connection protective element 140 is driven to close in a direction same as an energization direction of the parasitic diode 149, whereas the reverse connection protective element 140 does not conduct current when the DC power supply 101 is connected in reversed polarity by error and when the power supply unit 110A stops feeding power.

The opening and closing command generation unit 120A includes the RAM memory 121, the non-volatile program memory 122A, a non-volatile data memory which is a partial region of the non-volatile program memory 122A or a separate memory connected thereto, and a microprocessor operating in cooperation with the multi-channel A-to-D converter 123. The microprocessor generates a self-hold command signal DR1 once the power supply switch 102 is closed and power is fed from the power supply unit 110A, so that a power feeding operation by the power supply unit 110A is maintained even when the power supply switch 102 is opened. The microprocessor periodically monitors whether the power supply switch 102 is still closed. The microprocessor determines that the power supply switch 102 is opened when the input-side voltage VIG of the reverse connection protective element 140 is not generated at least while the reverse connection protective element 140 is opened and stops the power feeding operation by the power supply unit 110A by cancelling the self-hold command signal DR1 after a predetermined delay and stand-by period. The microprocessor determines that a supply fault abnormality is occurring due to fault contact between an output wire of the reverse connection protective element 140 and a positive-electrode wire of the DC power supply 101 when an output-side voltage of the reverse connection protective element 140 is generated but the input-side voltage VIG is not and saves at least abnormality occurrence history information by writing the abnormality occurrence history information in the non-volatile data memory in the delay and stand-by period.

In a case where the microprocessor detects a supply fault abnormality immediately after the power supply switch 102 is interrupted, the microprocessor either cancels the self-hold command signal DR1 after it notifies the abnormality for a predetermined time by extending at least the delay and stand-by period, or reads out supply-fault abnormality occurrence history information in the non-volatile data memory at least when the power supply switch 102 is closed again and, in a case where the supply fault abnormality had occurred when the power supply switch 102 was interrupted last time, notifies the abnormality which had occurred.

As has been described, in conjunction with claim 10 of the invention, in a case where a supply fault abnormality is detected after the power supply switch is interrupted, the abnormality is notified by extending the self-hold power feeding period or the abnormality is notified when the power supply switch is switched ON next time. Accordingly, there is a problem that the occurrence of a supply fault abnormality is difficult to defect while the power supply switch is switched ON. However, a supply fault abnormality is detected when the power supply switch is interrupted. Hence, there is a characteristic that not only can a supply fault abnormality be detected easily in a reliable manner, but also maintenance and inspection can be requested by notifying the abnormality in a reliable manner.

In a case where a determination is made as to whether or not a supply fault abnormality is occurring by monitoring a voltage across the reverse connection protective element while the power supply switch is closed, the output-side voltage of the reverse connection protective element is not necessary as high as or higher than the input-side voltage when an imperfect supply fault abnormality having a resistance value is occurring, and such a supply fault abnormality is difficult to detect. Also, in a case where a determination is made as to whether or not an indirect supply fault abnormality is occurring by monitoring a logic level of an output voltage of the load opening and closing element, there is a problem that a supply fault abnormality is not detected while the load opening and closing element is driven to close. Hence, it is immediately after the power supply switch is opened when a supply fault abnormality in the output wire of the reverse connection protective element can be detected in a reliable manner, and an optimal period is a period during which power is fed with a delay by the self-hold command signal.

The microprocessor monitors the input-side voltage VIG of the reverse connection protective element 140 with a high frequency as often as or less frequent than a first cycle T1 while the reverse connection protective element 140 is driven to close and determines that the power supply switch 102 is opened when the input-side voltage VIG is not generated. Even when the input-side voltage VIG of the reverse connection protective element 140 is generated, the microcomputer monitors the input-side voltage VIG of the reverse connection protective element 140 by periodically opening the reverse connection protective element 140 with a low frequency as often as or less frequent than a second cycle T2 (T2>T1) which is less frequent than the first cycle T1 and determines that the power supply switch 102 is opened when the input-side voltage VIG is not generated. A time zone over which the reverse connection protective element 140 is opened within a period of the second cycle T2 is a time zone T0 which is a part within the first cycle T1.

As has been described, in conjunction with claim 11 of the invention, the microprocessor determines the open and close states of the power supply switch by monitoring the input-side voltage of the reverse connection protective element with a high frequency while the reverse connection protective element is closed, whereas the microprocessor determines the open and close states of the power supply switch by monitoring the input-side voltage of the reverse connection protective element with a low frequency while the reverse connection protective element 140 is opened.

Hence, in a normal state where a supply fault abnormality is not occurring in the output wire of the reverse connection protective element, the open and close states of the power supply switch are determined with a high frequency, and when the power supply switch is opened, the current mode is quickly shifted to a save operation mode so that the self-hold command signal can be cancelled after important information, such as abnormality occurrence information and learning memory information, stored in the RAM memory is transferred to and saved in the non-volatile data memory. Meanwhile, the open and close states of the power supply switch are determined with a low frequency when a supply fault abnormality is occurring. Hence, when the power supply switch is opened, an open-circuit state of the power supply switch is detected with a time delay by the second cycle T2 at the latest.

However, in contrast to the first cycle T1 which is an ultra-high frequency comparable to a computation cycle of the microprocessor, a time allowed for a delay of open-circuit detection of the manually operated power supply switch is relatively long. Also, even when the reverse connection protective element is opened, there is no actual trouble if the power feeding to the electrical load is continued by the parasitic diode while the power supply switch is closed. Moreover, the reverse connection protective element is immediately closed at as fast a ratio as a duty ratio, T0/T2. Hence, there is a characteristic that a temperature rise of the parasitic diode can be suppressed.

Second Embodiment

Figure 3:
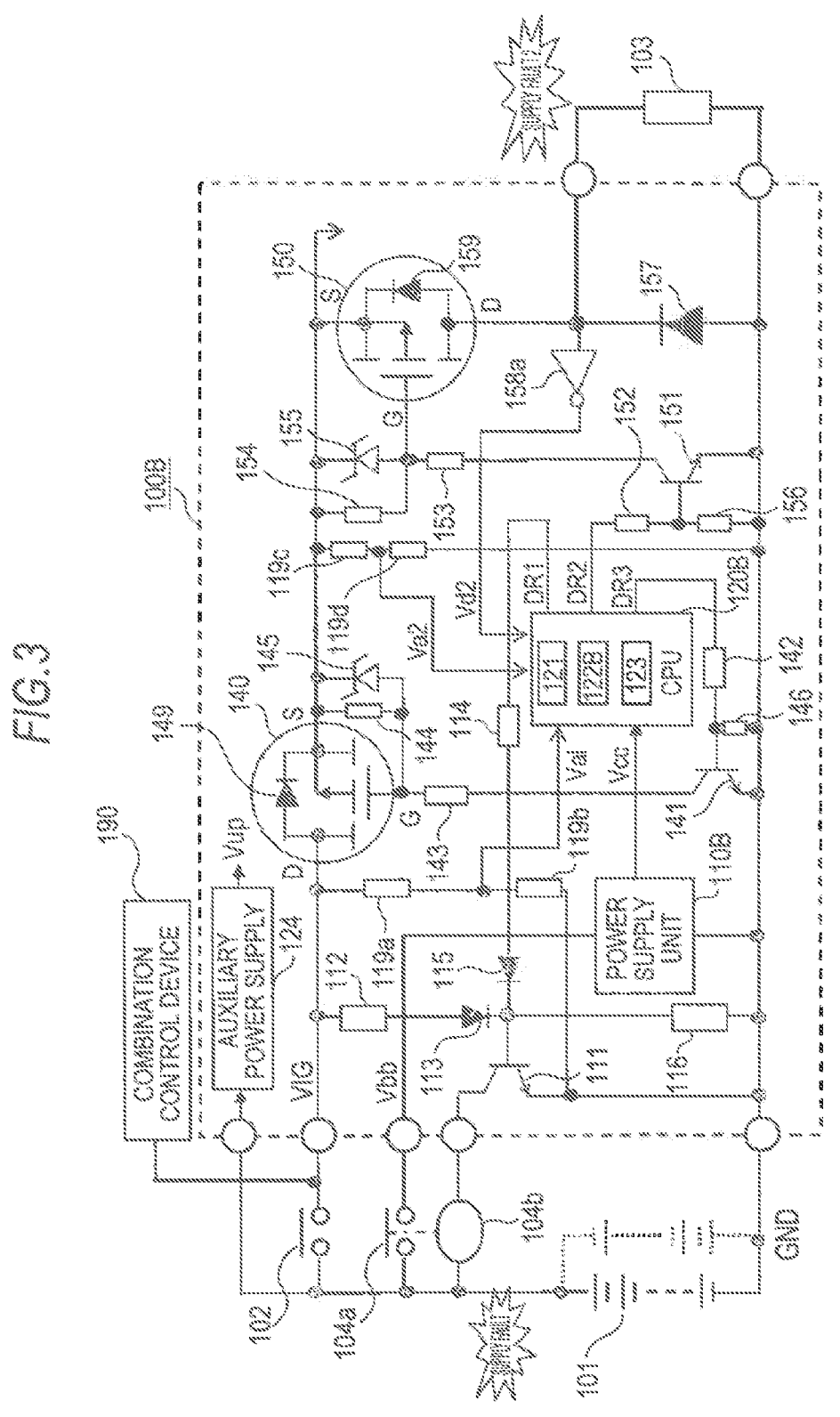

With reference to FIG. 3 showing an overall circuit configuration of an in-vehicle electronic control unit according to a second embodiment of the invention, a configuration will now be described in detail.

Major differences in FIG. 3 from the counterpart of FIG. 1 are as follows. That is, a power supply unit 110B is fed with power via an output contact 104a which is closed by energization of an exciting coil 104b of a power supply relay. A load opening and closing element 150 is a P-channel field-effect transistor. An input-side voltage and an output-side voltage of the reverse connection protective element 140 are inputted into an opening and closing command generation unit 120B in the form of analog signal voltages and the occurrence of a supply fault abnormality can be detected by comparing the both voltages. When the load opening and closing element 150 is opened, a supply fault abnormality can be detected also at the end of the load opening and closing element 150. The rest of the configuration is substantially the same as that in FIG. 1. In the respective drawings, same reference numerals denote same or equivalent portions.

Referring to FIG. 3, an in-vehicle electronic control unit 100B includes a main power supply terminal which is connected to a positive-electrode terminal of a DC power supply 101 that is an in-vehicle battery via an output contact 104a of a power supply relay and therefore to which a main power supply voltage Vbb is applied, a ground terminal which is connected to a ground circuit GND that is a vehicle body to which a negative-electrode terminal of the DC power supply 101 is connected, a power supply terminal which is connected to the positive-electrode terminal of the DC power supply 101 via a manual power supply switch 102 that is, for example, an ignition switch, and therefore to which an input-side voltage VIG is applied, and a load connection terminal to which is connected an in-vehicle electrical load 103 which is one of in-vehicle electrical load groups.

In a case where the in-vehicle electronic control unit 100B is, for example, an engine control unit, the in-vehicle electrical load groups controlled by the in-vehicle electronic control unit 100B include electromagnetic valves for fuel injection, a throttle valve opening control motor, ignition coils (in the case of a gasoline engine), and the like. Power is divided and fed to apart of a large number of the in-vehicle electrical load groups from the DC power supply 101 via an output contact of an unillustrated electromagnetic relay for load power supply. The in-vehicle electrical loads fed with divided power are placed under energization control by an unillustrated control opening and closing element provided in the in-vehicle electronic control unit 100B.

In addition, the power supply switch 102 feeds power also to a combination control device 190 which is, for example, a transmission control apparatus.

A power supply unit 110B is provided inside the in-vehicle electronic control unit 100B and the main power supply voltage Vbb is applied to the power supply unit 110B from the DC power supply 101 via the output contact 104a of the power supply relay. When the exciting coil 104b of the power supply relay is energized and the output contact 104a is closed, the power supply unit 110B feeds power to an opening and closing command generation unit 120B by generating a control voltage Vcc, which is a predetermined stabilizing voltage, for example, of DC 5 V.

The power supply unit 110B is formed of a constant-voltage control circuit using, for example, a junction-type transistor. A base circuit is configured in such a manner that when the DC power supply 101 is connected in reversed polarity indicated by a dotted line by error, the junction-type transistor ceases conduction and no longer generates the control voltage Vcc.

A start-up transistor 111 which energizes the exciting coil 104b of the power supply relay is an NPN transistor that conducts current when supplied with a base current by a series circuit made up of a first drive resistor 112 and a first diode 113 when the power supply switch 102 is closed. When a logic level of a self-hold command signal DR1 generated by the opening and closing command generation unit 120B shifts to "H", a base current is supplied to the start-up transistor 111 by a series circuit made up of a second drive resistor 114 and a second diode 115. Hence, once the opening and closing command generation unit 120B starts an operation, the exciting coil 104b of the power supply relay maintains an energized state even when the power supply switch 102 is opened.

When the power supply switch 102 is opened and the self-hold command signal DR1 takes a logic level "L", the start-up transistor 111 is opened in a reliable manner by an open-circuit stabilizing resistor 116 connected between the base terminal and the emitter terminal.

When the power supply switch 102 is closed, the input-side voltage VIG is applied to voltage-dividing resistors 119a and 119b. A voltage across the resistor 119b on a lower stream side is inputted into a multi-channel A-to-D converter 123 in the opening and closing command generation unit 120B as a power supply monitor voltage Va1.

An output-side voltage of the reverse connection protective element 140 is applied to voltage-dividing resistors 119c and 119d. A voltage across the resistor 119d on a lower stream side is inputted into the multi-channel A-to-D converter 123 in the opening and closing command generation unit 120B as a power feeding monitor voltage Va2.

The opening and closing command generation unit 120B includes a RAM memory 121, a non-volatile program memory 122B, an unillustrated non-volatile data memory which is a partial region of the non-volatile program memory 122B or a separate memory connected thereto, and a microprocessor which operates in cooperation with the multi-channel A-to-D converter 123. The RAM memory 121 is fed with power from an auxiliary power supply 124 which generates a stabilizing voltage Vup, for example, of DC 2.8 V when fed with power directly from the DC power supply 101. The RAM memory 121 can therefore hold a memory content even in a state where the power supply switch 102 is opened and the power supply unit 110B stops an output.

However, in order to prevent a loss of important data, such as learning memory information, abnormality occurrence history information, or information on time-dependent characteristic change of various sensors, written into the RAM memory 121 when an abnormal voltage drop occurs in the DC power supply 101 which is the in-vehicle battery or when the power supply terminal is opened for battery replacement, the self-hold command signal DR1 is cancelled after the important data is transferred to and saved in the non-volatile data memory within a predetermined time immediately after the power supply switch 102 is opened and the microprocessor stops by itself after it canceled the self-hold command signal DR1.

Alternatively, it may be configured in the following manner. That is, a signal cycle of a watchdog pulse generated by the microprocessor is monitored by an unillustrated watchdog timer so that the watchdog timer generates the self-hold command signal DR1 while the microprocessor operates normally, and the self-hold command signal DR1 is cancelled as the microprocessor automatically stops after the microprocessor recognizes that the power supply switch 102 is opened on the ground that the power supply monitor voltage Va1 drops to or below a predetermined value and transfers and saves the data into the non-volatile data memory.

A reverse connection protective element 140 which is a P-channel field-effect transistor is connected in series to the in-vehicle electrical load 103 on an upper stream side as in the case of FIG. 1. The reverse connection protective element 140 is configured so as to conduct current in a direction inverse to a direction of a normal opening and closing element, so that the drain terminal D is on the power supply side and the source terminal S is on the load side.

A series circuit made up of a drive transistor 141 and a drive resistor 143 is connected between the gate terminal G of the reverse connection protective element 140 and the ground circuit GND. The drive transistor 141 which is an NPN transistor is driven to energize via a base resistor 142 when an energization command signal DR3 generated by the opening and closing command generation unit 120B takes a logic level "H". Energization of the drive transistor 141 is stopped by an open-circuit stabilizing resistor 146 connected between the base terminal and the emitter terminal of the drive transistor 141 when the energization command signal DR3 takes a logic level "L" or the opening and closing command generation unit 120B stops an operation because power feeding to the opening and closing command generation unit 120B is stopped.

The load opening and closing element 150 is, for example, a P-channel field-effect transistor connected in series between the reverse connection protective element 140 and the in-vehicle electrical load 103. A signal voltage by an opening and closing command signal DR2 generated by the opening and closing command generation unit 120B drives a control transistor 151 via a base resistor 152. The control transistor 151 is connected to the gate terminal G of the load opening and closing element 150 via a drive resistor 153. A gate resistor 154 and a constant voltage diode 155 are connected in parallel between the gate terminal G and the source terminal S.

Hence, when the logic level of the opening and closing command signal DR2 shifts to "H", the control transistor 151 conducts current and the load opening and closing element 150 conducts current between the source terminal S and the drain terminal D in a forward direction. An open-circuit stabilizing resistor 156 is connected between the base terminal and the emitter terminal of the control transistor 151 which is an NPN transistor. When the logic level of the opening and closing command signal DR2 shifts to "L", the control transistor 151 is opened and conduction between the source terminal S and the drain terminal D of the load opening and closing element 150 is interrupted, so that an exciting current flowing to the in-vehicle electrical load 103 is diverted to a freewheel diode 157 connected in parallel with the in-vehicle electrical load 103.

The load opening and closing element 150 can be a PNP junction-type transistor. However, when a field-effect transistor is used, there is an advantage that a voltage drop between elements during a close circuit state becomes extremely small and a loss of power can be suppressed.

It should be noted, however, that in a case where the field-effect transistor is used, because a parasitic diode 159 is formed between the source terminal S and the drain terminal D in a direction indicated in the drawing, the load opening and closing element 150 is not furnished with an interruption function as an opening and closing element in a conduction direction of the parasitic diode 159. A load voltage monitor element 158a which is an invert logical element generates a load monitor signal Vd2 which takes a logic level "L" when the load opening and closing element 150 is closed and inputs this signal into the opening and closing command generation unit 120B.

Hence, when the logic level of the opening and closing command signal DR2 shifts to "H" and the load opening and closing element 150 is closed, it is normal that the logic level of the load monitor signal Vd2 shifts to "L". Also, when the logic level of the opening and closing command signal DR2 shifts to "L" and the load opening and closing element 150 is opened, it is normal that the logic level of the load monitor signal Vd2 shifts to "H". In a case where the logic level of the load monitor signal Vd2 exhibits "L" in this instance, it means that a supply fault abnormality is occurring due to a positive-side wire of the in-vehicle electrical load 103 coming in fault contact with a positive-electrode wire of the DC power supply 101.

A supply fault abnormality detected on the output side of the load opening and closing element 150 as above cannot be detected when the load opening and closing element 150 is driven to close. Hence, this supply fault abnormality is referred to as the indirect supply fault abnormality hereinafter.

A function and an operation of the in-vehicle electronic control unit according to the second embodiment of the invention configured as in FIG. 3 will now be described in detail with reference to a flowchart shown in FIG. 4 used to describe an operation.

Firstly, referring to FIG. 3, an input-side voltage VIG is applied when the power supply switch 102 is closed and a base current of the start-up transistor 111 is supplied via the first drive resistor 112 and the first diode 113. The exciting coil 104b of the power supply relay is thus energized and the output contact 104a is closed. As a result, the power supply unit 110B starts an operation. The power supply unit 110B feeds power to the opening and closing command generation unit 120B by generating a control voltage Vcc from the main power supply voltage Vbb.

Accordingly, the microprocessor in the opening and closing command generation unit 120B starts an operation. The opening and closing command generation unit 120B recognizes that the power supply switch 102 is closed on the basis of a voltage level of the power supply monitor voltage Va1 and starts a control operation described below with reference to FIG. 4. In starting the control operation, the opening and closing command generation unit 120B generates a self-hold command signal DR1 to maintain an operation state of the start-up transistor 111 via the second drive resistor 114 and the second diode 115 and also generates an energization command signal DR3 to drive the drive transistor 141 to close.

When the power supply switch 102 and the drive transistor 141 are closed, the input-side voltage VIG is supplied to a series circuit made up of the gate resistor 144 and the drive resistor 143 via the parasitic diode 149 in the reverse connection protective element 140. The reverse connection protective element 140 starts energization in a direction from the drain terminal D on the input side to the source terminal S on the output side by a gate voltage which is a voltage across the gate resistor 144. The reverse connection protective element 140 is thus in a condition that power can be fed to the in-vehicle electrical load 103.

Herein, by shifting the logic level of the opening and closing command signal DR2 to "H" or "L", the load opening and closing element 150 conducts current or ceases to conduct current. Hence, a power feeding state to the in-vehicle electrical load 103 can be controlled.

In a case where there is more than one in-vehicle electrical load 103, the opening and closing command generation unit 120B supplies an opening and closing command signal to each of the load opening and closing elements connected in series to the respective in-vehicle electrical loads. While the opening and closing command generation unit 120B is in operation, a plurality of the in-vehicle electrical loads are driven under control and learning memory information on an operating state, information on time-dependent changes of detection characteristics of an unillustrated input sensor, or abnormality occurrence history information is written into the RAM memory 121 as needed.

When the power supply switch 102 is opened in this state, the opening and closing command generation unit 120B recognizes the opening on the basis of a voltage level of the power supply monitor voltage Va1 and cancels the self-hold command signal DR1 after important information written into the RAM memory 121 is transferred to and written in the unillustrated non-volatile data memory or a particular region of the program memory 122B.

As a result, the exciting coil 104b of the power supply relay is de-energized because the start-up transistor 111 is opened and the power supply unit 110B becomes inoperable. Power feeding to the opening and closing command generation unit 120B is thus stopped.

On the other hand, in a case where the power supply switch 102 is closed after the DC power supply 101 is connected in reversed polarity as is indicated by a dotted line of FIG. 3 by error, the power supply unit 110B itself is protected by the internal circuit configuration and does not generate a control voltage Vcc. A gate voltage below a voltage at the source terminal S is not applied to the gate terminal G of the reverse connection protective element 140, either. Hence, because the reverse connection protective element 140 is in a non-conducting state, a power-supply short circuit current by a series circuit made up of the parasitic diode 159 in the load opening and closing element 150 and the freewheel diode 157 is prevented from flowing.

When a supply fault abnormality occurs due to the positive-side wire of the in-vehicle electrical load 103 which is the output wire of the reverse connection protective element 140 coming in fault contact with the positive-electrode wire of the DC power supply 101 when the opening and closing command generation unit 120B is in normal operation in a state where the DC power supply 101 is connected in proper polarity and the power supply switch 102 is closed, sneaking of a supply-fault power supply occurs via the parasitic diode 159 in the load opening and closing element 150 independently of whether the load opening and closing element 150 is opened or closed. The reverse connection protective element 140 thus maintains a close-circuit state even when the power supply switch 102 is opened later. The supply-fault power supply therefore feeds power to the combination control device 190 by sneaking in an inverse direction from the source terminal S to the drain terminal D of the reverse connection protective element 140. Also, the opening and closing command generation unit 120B can no longer detect that the power supply switch 102 is opened on the basis of the power supply monitor voltage Va1. The opening and closing command generation unit 120B thus maintains an operating state.

To avoid this problem, the opening and closing command generation unit 120B of the second embodiment monitors a difference voltage between the power supply monitor voltage Va1 and the power feeding monitor voltage Va2 and opens the reverse connection protective element 140 when the difference voltage has a value equal to or less than a predetermined value on the assumption that a supply fault abnormality is occurring.

As a result, when the power feeding monitor voltage Va2 is generated but the power supply monitor voltage Va1 is not, the opening and closing command generation unit 120B specifies that a supply fault abnormality is occurring. The opening and closing command generation unit 120B therefore stops the self-hold command signal DR1 after the abnormality occurrence history information is transferred to and saved in the unillustrated non-volatile data memory or a partial region of the program memory 122B.

When the power supply monitor voltage Va1 has a value equal to or greater than a predetermined value after the reverse connection protective element 140 is opened, it means that the power supply switch 102 is still closed. When the power feeding monitor voltage Va2 is also generated in this instance, it can be determined that power is fed via the parasitic diode 149 in the reverse connection protective element 140. Hence, even when the supply fault abnormality is occurring, it is impossible to detect the occurrence in this state.

It should be noted that even when a supply fault abnormality is occurring in the output wire of the reverse connection protective element 140 while the power supply switch 102 is opened, because the drive transistor 141 is in a non-conducting state, the reverse connection protective element 140 is in an open-circuit state. The fault-supply power supply therefore does not flow inversely to the input side of the reverse connection protective element 140.

Figure 4:
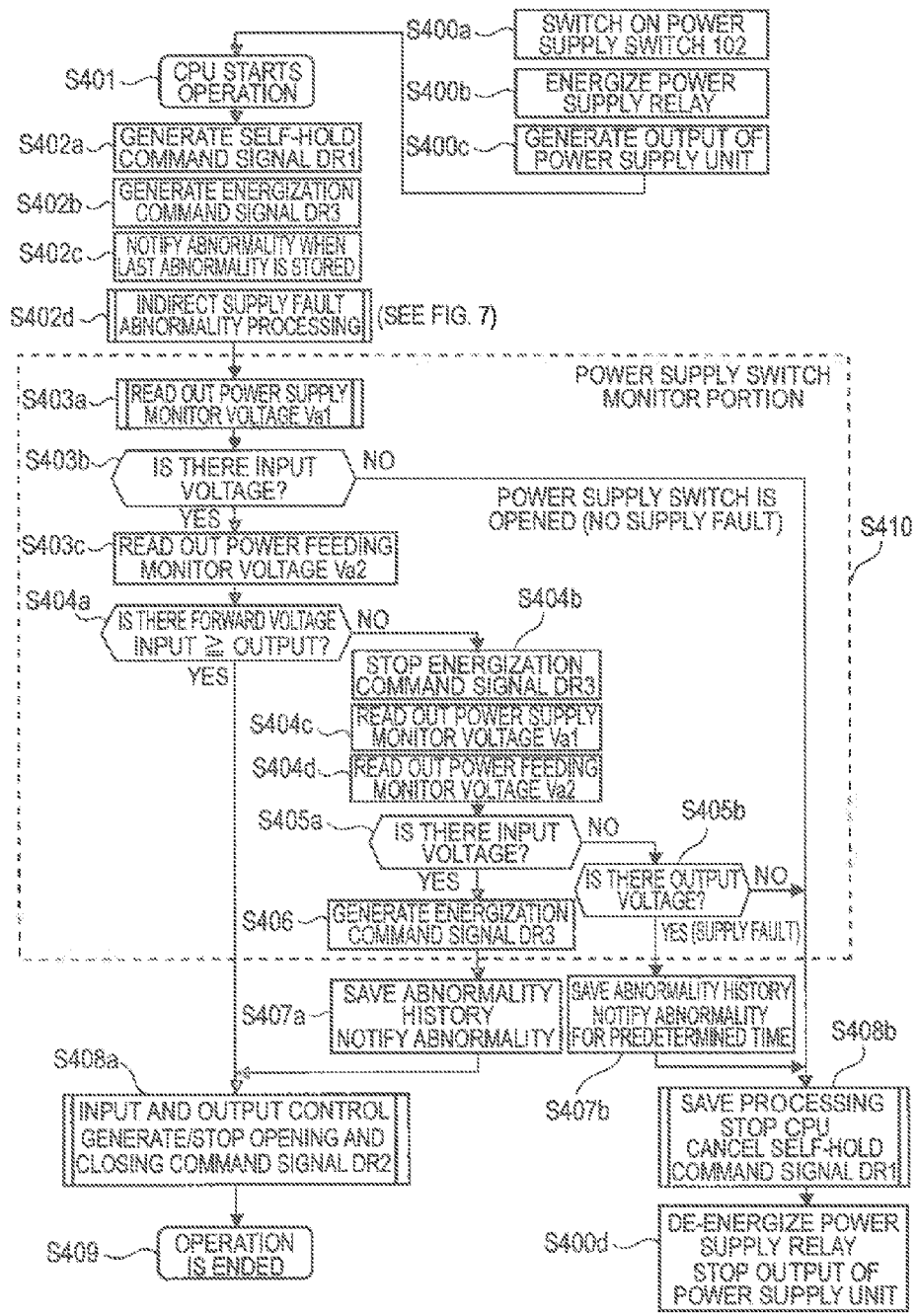
FIG. 4 is a view showing a flowchart used to describe an operation by the overall circuit diagram of FIG. 3.

FIG. 4 showing a flowchart used to describe an operation by the circuit configuration of FIG. 3 will now be described.

Referring to FIG. 4, Step S400a is a step in which the power supply switch 102 is closed and thereby switched ON in the opening and closing command generation unit 120B connected as in FIG. 3. Subsequent Step S400b is a step in which the output contact 104a is closed as the power supply relay is energized because the power supply switch 102 is closed. Subsequent Step S400c is a step in which, because the main power supply voltage Vbb is applied, the power supply unit 110B feeds power to the opening and closing command generation unit 120B by generating a control voltage Vcc.

Subsequent Step S401 is a step in which the microprocessor is started as power is fed to the opening and closing command generation unit 120B and opening and closing control of the load opening and closing element 150 connected in series to the electrical load group is started according to a content of the control program stored in the program memory 122B and in response to an operating state of an unillustrated input signal.

Subsequent Step S402a is a step in which the self-hold command signal DR1 for the start-up transistor 111 is generated so that a conducting state of the start-up transistor 111 is maintained even when the power supply switch 102 is opened. Subsequent Step S402b is a step in which the energization command signal DR3 for the drive transistor 141 is generated to drive the reverse connection protective element 140 to close. Subsequent Step S402c is a step in which a content of the non-volatile data memory is read out and an abnormality is notified in a case where a supply fault abnormality had occurred when the operation was stopped last time.

Subsequent Step Block S402d is a processing step relating to an indirect supply fault abnormality described below with reference to FIG. 7. In Step Block S402d, the opening and closing command generation unit 120B monitors an output voltage of the load opening and closing element 150 each time the load opening and closing element 150 is opened to determine whether or not an indirect supply fault abnormality is occurring. Upon detection of the indirect supply fault abnormality, the opening and closing command generation unit 120B determines whether the power supply switch 102 is opened by opening the reverse connection protective element 140. Also, upon detection of the indirect supply fault abnormality, the opening and closing command generation unit 120B forcedly closes the load opening and closing element 150 until an open-circuit command is generated next time.

Subsequent Step S403a is a step from which advancement is made to Step S403b after the value of the power supply monitor voltage Va1 is read out. Step S403b is a determination step in which a determination is made as to whether the input-side voltage VIG is generated on the basis of a voltage level of the power supply monitor voltage Va1. When the power supply monitor voltage Va1 has a value equal to or greater than a predetermined value, the presence of the input-side voltage VIG is determined and advancement is made to Step S403c by making a determination of YES. When the power supply monitor voltage Va1 has a value less than the predetermined value, the absence of the input-side voltage VIG is determined and advancement is made to Step Block S408b by making a determination of NO. Step S403c is a step from which advancement is made to Step S404a after the value of the power feeding monitor voltage Va2 is read out.

Step S404a is a determination step in which the power supply monitor voltage Va1 and the power feeding monitor voltage Va2 are compared and advancement is made to Step Block S408a when Va1≥Va2 by making a determination of YES and advancement is made to Step S404b when Va1<Va2 by making a determination of NO.

Step S404b is a step in which the reverse connection protective element 140 is opened by stopping the energization command signal DR3 generated in Step S402b. Subsequent Step S404c is a step from which advancement is made to Step S404d after the value of the power supply monitor voltage Va1 is read out again. Step S404d is a step from which advancement is made to Step S405a after the value of the power feeding monitor voltage Va2 is read out. Step S405a is a determination step in which a determination is made as to whether the input-side voltage VIG is generated on the basis of the voltage level of the power supply monitor voltage Va1 read out in Step S404c. When the value of the power supply monitor voltage Va1 is equal to or greater than the predetermined value, the presence of the input-side voltage VIG is determined and advancement is made to Step S406 by making a determination of YES. When the value of the power supply monitor voltage Va1 is less than the predetermined value, the absence of the input-side voltage VIG is determined and advancement is made to Step S405b by making a determination of NO.

Step S405b is a determination step in which a determination is made as to whether an output-side voltage of the reverse connection protective element 140 is generated on the basis of the voltage level of the power feeding monitor voltage Va2 read out in Step S404d. When the value of the power feeding monitor voltage Va2 is equal to or greater than the predetermined value, the presence of the output-side voltage is determined and advancement is made to Step S407b by making a determination of YES. When the value of the power feeding monitor voltage Va2 is less than the predetermined value, the absence of the output-side voltage is determined and advancement is made to Step Block S408b by making a determination of NO.

A determination of YES is made in Step S405a in a case where a close-circuit state of the power supply switch 102 is continuing. The energization command signal DR3 stopped in Step S404b is generated again in Step S406, according to which signal the reverse connection protective element 140 is driven to close. A period from Step S404b to Step S406 is a partial period of the entire period circulating from operation starting Step S401 to operation ending Step S409. Hence, a time over which to open the reverse connection protective element 140 is limited to an extremely short period.

A determination of YES is made in Step S405b in a state where the output-side voltage of the reverse connection protective element 140 is generated in the absence of the input-side voltage VIG, that is, when a supply fault abnormality is occurring. Hence, supply fault occurrence information is written into the RAM memory 121 in Step S407b and advancement is made to Step Block S408b after the abnormality is notified for a predetermined time.

Step Block S408a is an input and output control block during normal operation in which the opening and closing command signal DR2 for the load opening and closing element 150 is generated or stopped. Advancement is made from Step Block S408a to operation ending Step S409. Operation ending Step S409 is a step in which return is made to operation starting Step S401 after a cycle time, for example, of 10 msec at the latest since the other control programs were performed, so that Step S401 and subsequent steps are repetitively performed.

In Step Block S408b performed when a determination of NO is made in Step S403b or Step S405b, that is, in a state where it is determined that the power supply switch 102 is opened, the self-hold command signal DR1 is cancelled after learning information and abnormality occurrence information written into the RAM memory 121 are transferred to and saved in the non-volatile data memory.

In subsequent Step S400d, the power supply relay is de-energized and the output contact 104a is opened so that an operation of the power supply unit 110B is stopped. Step Block S410 made up of Step S403a through Step S406 forms a power supply switch monitor portion. The content shown in Step Block S410 can be created by hardware using a logical element without depending on the microprocessor.

Gist and Characteristic of Second Embodiment

As can be obvious from the description above, the in-vehicle electronic control unit 100B according to the second embodiment of the invention includes: the load opening and closing element 150 which is connected in series to a part or all of in-vehicle electrical load groups fed with power from the DC power supply 101; the opening and closing command generation unit 120B which supplies an opening and closing command signal DR2 to the load opening and closing element 150 according to a driving condition of a vehicle; and the power supply unit 110B which feeds power to the opening and closing command generation unit 120B by generating a predetermined stabilizing voltage when fed with power from the DC power supply 101 in response to the manual power supply switch 102 which is now closed, wherein the power supply switch 102 feeds power to the in-vehicle electrical load 103 which is the part or all of the in-vehicle electrical load groups via the reverse connection protective element 140. The opening and closing command generation unit 120B generates a self-hold command signal DR1 once the power supply switch 102 is closed and power is fed from the power supply unit 110B, so that a power feeding operation by the power supply unit 110B is maintained even when the power supply switch 102 is opened. The reverse connection protective element 140 is a field-effect transistor which includes the parasitic diode 149, and is configured in such a manner that a gate voltage is applied by the drive transistor 141 so that the reverse connection protective element 140 is driven to close in a direction same as an energization direction of the parasitic diode 149 when the DC power supply 101 is connected in proper polarity, whereas the reverse connection protective element 140 does not conduct current when the DC power supply 101 is connected in reversed polarity by error and when the power supply unit 110B stops feeding power.

The opening and closing command generation unit 120B receives an input of a power supply monitor voltage Va1 which is used to monitor the input-side voltage VIG of the reverse connection protective element 140, which is an output voltage of the power supply switch 102, and to determine that the power supply switch 102 is opened when the input-side voltage VIG has a value less than a predetermined value. The opening and closing command generation unit 120B confirms the open and close states of the power supply switch 102 even when the input-side voltage VIG is as high as or higher than a voltage of the predetermined value by monitoring the input-side voltage VIG while the reverse connection protective element 140 is opened, and stops power feeding by the power supply unit 110B by cancelling the self-hold command signal DR1 after a predetermined delay time upon detection of an open-circuit state of the power supply switch 102. The drive transistor 141 is changed to an open-circuit state when the power feeding by the power supply unit 110B stops and the reverse connection protective element 140 is changed to an open-circuit state even when a supply fault abnormality is occurring due to fault contact between an output wire of the reverse connection protective element 140 and a positive-electrode wire of the DC power supply 101, so that the power supply unit 110B is not started again while the power supply switch 102 is opened.

The reverse connection protective element 140 controlled to open and close by the opening and closing command generation unit 120B is controlled to open and close via the drive transistor 141 in response to a difference voltage between a power supply monitor voltage Va1 in proportion to the input-side voltage VIG and a power feeding monitor voltage Va2 in proportion to the output-side voltage. The reverse connection protective element 140 is driven to close on the ground that a power feeding current as high as or higher than a predetermined threshold current is flowing in a conduction direction of the parasitic diode 149, and a close-circuit command is cancelled at least when the input-side voltage VIG is as high as or lower than the output-side voltage.

As has been described, in conjunction with claim 4 of the invention, signal voltages on the input side and on the output side of the reverse connection protective element are compared relatively with each other. When the input-side voltage is not higher than the output-side voltage, the reverse connection protective element is opened. Then, it is determined that the power supply switch is closed when the input-side voltage is generated. It is determined that the power supply switch is opened when neither the input-side voltage nor the output-side voltage is generated. When the output-side voltage is generated but the input-side voltage is not, it is determined that the power supply switch is opened but a supply fault abnormality is occurring.

Hence, there is no need to periodically open and close the reverse connection protective element. Because the open and close states of the power supply switch can be detected by constantly closing the reverse connection protective element until a supply fault abnormality occurs, a loss of power accompanying the opening and closing of the reverse connection protective element does not occur during a normal operation. Hence, there is a characteristic that a temperature rise of the reverse connection protective element can be suppressed.

In a case where an imperfect supply fault abnormality having a resistance component occurs, the output-side voltage of the reverse connection protective element is not necessarily as high as or higher than the input-side voltage when the power supply switch is closed. However, when the power supply switch is opened while a supply fault abnormality, even in an imperfect form, is occurring, the output-side voltage of the reverse connection protective element becomes as high as or higher than the input-side voltage without fail. Hence, a supply fault abnormality can be detected in a reliable manner by opening the reverse connection protective element in this instance, which makes it possible to immediately detect that the power supply switch is opened.

The load opening and closing element 150 is a field-effect transistor located upstream of the in-vehicle electrical load 103 and connected to the reverse connection protective element 140 in a lower stream location. The opening and closing command generation unit 120B receives an input of a load monitor signal Vd2 used to monitor an output voltage of the load opening and closing element 150. The opening and closing command generation unit 120B monitors the load monitor signal Vd2 each time the opening and the closing command generation unit 120B changes the opening and closing command signal DR2 for the load opening and closing element 150 to an open-circuit command, and determines that an indirect supply fault abnormality is occurring due to an output wire of the load opening and closing element 150 coming in fault contact with the positive-electrode wire of the DC power supply 101 when the output voltage of the load opening and closing element 150 is generated. The opening and closing command generation unit 120B further generates an open-circuit command for the reverse connection protective element 140 upon detection of the occurrence of the indirect supply fault abnormality to determine whether the power supply switch 102 is opened, and immediately drives the reverse connection protective element 140 to close when the power supply switch 102 is closed.

As has been described, in conjunction with claim 7 of the invention, the opening and closing command generation unit determines whether or not an indirect supply fault abnormality is occurring by monitoring an output voltage of the load opening and closing element each time the load opening and closing element is opened. The opening and closing command generation unit determines whether the power supply switch is opened by opening the reverse connection protective element when the indirect supply fault abnormality is detected.

Hence, in the electronic control unit of a type in which the output wire of the reverse connection protective element is not directly pulled outside, the open and close states of the power supply switch can be detected by constantly closing the reverse connection protective element until an indirect supply fault abnormality occurs. Therefore, a loss of power accompanying the opening and closing of the reverse connection protective element does not occur during a normal operation. Hence, there is a characteristic that a temperature rise of the reverse connection protective element can be suppressed. In particular, in the electronic control unit of a type in which the load opening and closing element is opened and closed frequently, the occurrence of an indirect supply fault abnormality can be detected quickly.

As can be obvious from the description above, the power feeding control method of an in-vehicle electronic control unit according to the second embodiment of the invention is the power feeding control method of the in-vehicle electronic control unit 100B. The in-vehicle electronic control unit 100B includes: the load opening and closing element 150 which is connected in series to a part or all of in-vehicle electrical load groups fed with power from the DC power supply 101; the opening and closing command generation unit 120B which supplies an opening and closing command signal DR2 to the load opening and closing element 150 according to a driving condition of a vehicle; and the power supply unit 110B which feeds power to the opening and closing command generation unit 120B by generating a predetermined stabilizing voltage when fed with power from the DC power supply 101 in response to the manual power supply switch 102 which is now closed, and configured in such a manner that the power supply switch 102 feeds power to the in-vehicle electrical load 103 which is the part or all of the in-vehicle electrical load groups via the reverse connection protective element 140. A gate voltage is applied by the drive transistor 141 to the reverse connection protective element 140 which is a field-effect transistor including the parasitic diode 149 when the DC power supply 101 is connected in proper polarity so that the reverse connection protective element 140 is driven to close in a direction same as an energization direction of the parasitic diode 149, whereas the reverse connection protective element 140 does not conduct current when the DC power supply 101 is connected in reversed polarity by error and when the power supply unit 110B stops feeding power.

The opening and closing command generation unit 120B includes the RAM memory 121, the non-volatile program memory 122B, a non-volatile data memory which is a partial region of the non-volatile program memory 122B or a separate memory connected thereto, and a microprocessor operating in cooperation with the multi-channel A-to-D converter 123. The microprocessor generates a self-hold command signal DR1 once the power supply switch 102 is closed and power is fed from the power supply unit 110B, so that a power feeding operation by the power supply unit 110B is maintained even when the power supply switch 102 is opened. The microprocessor periodically monitors whether the power supply switch 102 is still closed. The microprocessor determines that the power supply switch 102 is opened when the input-side voltage VIG of the reverse connection protective element 140 is not generated at least while the reverse connection protective element 140 is opened and stops the power feeding operation by the power supply unit 110B by cancelling the self-hold command signal DR1 after a predetermined delay and stand-by period. The microprocessor determines that a supply fault abnormality is occurring due to fault contact between an output wire of the reverse connection protective element 140 and a positive-electrode wire of the DC power supply 101 when an output-side voltage of the reverse connection protective element 140 is generated but the input-side voltage VIG is not and saves at least abnormality occurrence history information by writing the abnormality occurrence history information in the non-volatile data memory in the delay and stand-by period.

In a case where the microprocessor of the opening and closing command generation unit 120B detects a supply fault abnormality immediately after the power supply switch 102 is interrupted, the microprocessor either cancels the self-hold command signal DR1 after the microprocessor notifies the abnormality for a predetermined time by extending at least the delay and stand-by period, or reads out supply-fault abnormality occurrence history information in the non-volatile data memory at least when the power supply switch 102 is closed again and, in a case where the supply fault abnormality had occurred when the power supply switch 102 was interrupted last time, notifies the abnormality which had occurred.

As has been described, in conjunction with claim 10 of the invention, as in the first embodiment above, in a case where a supply fault abnormality is detected after the power supply switch is interrupted, the abnormality is notified by extending the self-hold power feeding period or the abnormality is notified when the power supply switch is switched ON next time. There is a problem that the occurrence of a supply fault abnormality is difficult to defect while the power supply switch is switched ON. However, a supply fault abnormality is detected when the power supply switch is interrupted. Hence, there is a characteristic that not only can a supply fault abnormality be detected easily in a reliable manner, but also maintenance and inspection can be requested by notifying the abnormality in a reliable manner.

The input-side voltage VIG is monitored constantly or periodically while the reverse connection protective element 140 is driven to close, and it is determined that the power supply switch 102 is opened when the input-side voltage VIG is not generated. Signal voltages on an input side and an output side of the reverse connection protective element 140 are compared relatively with each other constantly or periodically even when the input-side voltage VIG is generated, and the reverse connection protective element 140 is opened when the input-side voltage VIG is not higher than the output-side voltage to make determinations as follows: it is determined that the power supply switch 102 is closed when the input-side voltage VIG is generated; it is determined that the power supply switch 102 is opened when neither the input-side voltage VIG nor the output-side voltage is generated; and it is determined that the power supply switch 102 is opened but a supply fault abnormality is occurring when the output-side voltage is generated but the input-side voltage VIG is not.

As has been described, in conjunction with claim 12 of the invention, the microprocessor monitors the input-side voltage of the reverse connection protective element while the reverse connection protective element is driven to close. The microprocessor determines that the power supply switch is opened when the input-side voltage is not generated and determines whether the power supply switch is opened or closed and whether or not a supply fault failure is occurring by opening the reverse connection protective element when the input-side voltage of the reverse connection protective element is not higher than the output-side voltage, Hence, there is no need to periodically open and close the reverse connection protective element. Because the open and close states of the power supply switch can be detected by constantly closing the reverse connection protective element until a supply fault abnormality occurs, a loss of power accompanying the opening and closing of the reverse connection protective element does not occur during a normal operation. Hence, there is a characteristic that a temperature rise of the reverse connection protective element can be suppressed. Also, even in the case of an imperfect supply fault abnormality, the input-side voltage of the reverse connection protective element becomes lower than the output-side voltage when the power supply switch is opened. Hence, there is a characteristic that when the power supply switch is opened, the opening can be detected immediately.

A plurality of in-vehicle electrical loads, to each of which the load opening and closing element is connected in series, are connected in parallel with the reverse connection protective element 140 in a lower stream location. The load opening and closing element 150 which is a field-effect transistor is connected in series to a particular electrical load 103 among a plurality of the in-vehicle electrical loads in an upper stream location. An open-circuit output voltage of the load opening and closing element 150 is monitored each time an opening and closing command signal DR2 for the load opening and closing element 150 is changed to an open-circuit command. It is determined that an indirect supply fault abnormality is occurring due to an output wire of the load opening and closing element 150 coming in fault contact with the positive-electrode wire of the DC power supply 101 when the open-circuit output voltage is generated. When it is detected that the indirect supply fault abnormality is occurring, the load opening and closing element 150 is forcedly closed until the opening and closing command signal DR2 is changed to the open-circuit command again.

As has been described, in conjunction with claim 13, whether or not an indirect supply fault abnormality is occurring in the output wire of the load opening and closing element is determined each time the load opening and closing element is opened. When an indirect supply fault abnormality is detected, the load opening and closing element is forcedly closed until an open-circuit command is generated next time. Hence, there is a characteristic that a temperature rise of the load opening and closing element can be reduced considerably by avoiding power from being fed to another electrical load via the internal parasitic diode in the load opening and closing element in which the indirect supply fault abnormality has occurred and thereby conducting current inversely from the drain terminal to the source terminal in the forcedly closed load opening and closing element.

Third Embodiment

Figure 5:
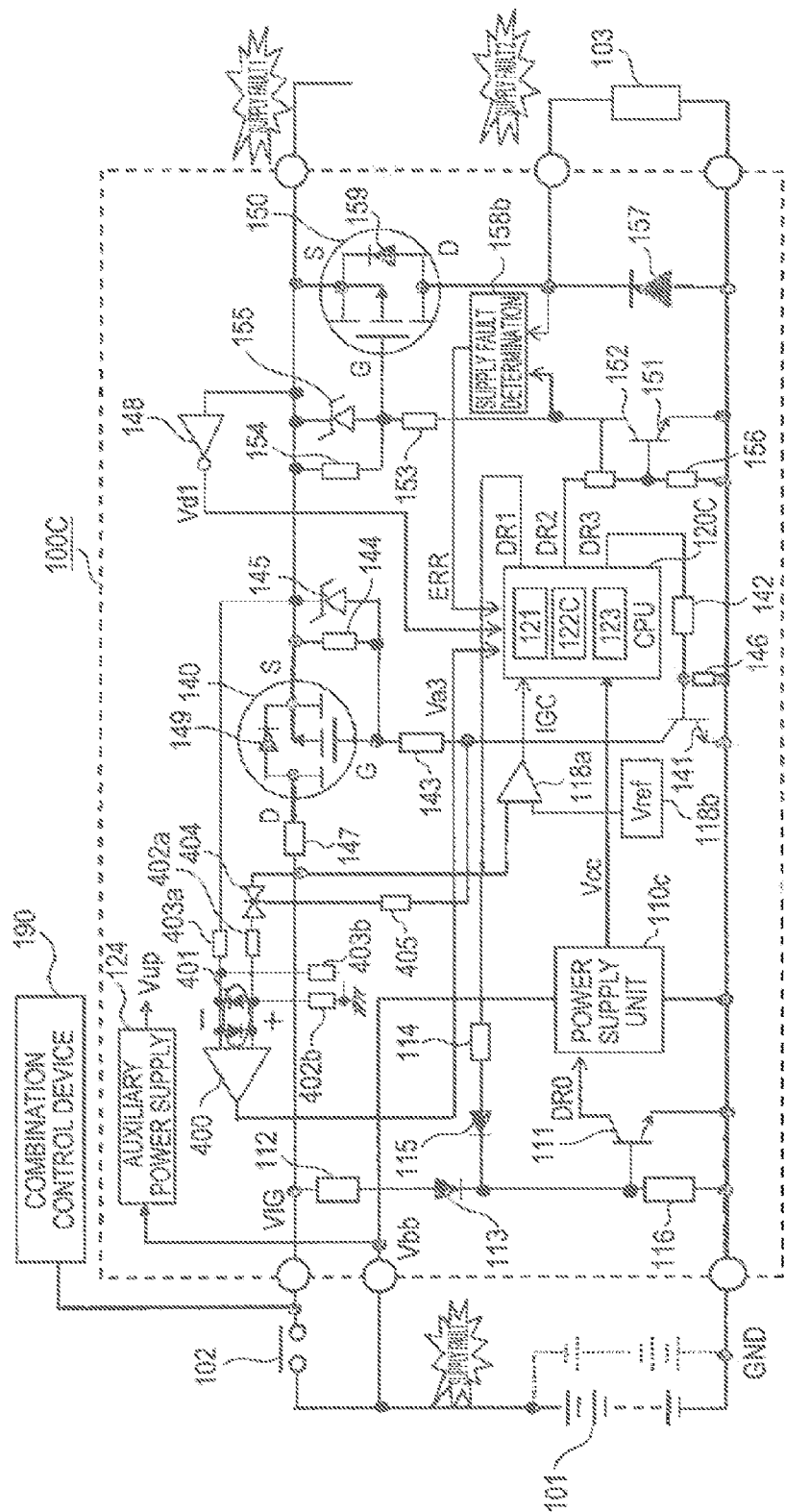
FIG. 5 is an overall circuit diagram of an in-vehicle electronic control unit according to a third embodiment of the invention.

With reference to FIG. 5 showing an overall circuit configuration of an in-vehicle electronic control unit according to a third embodiment of the invention, a configuration chiefly focused on differences from the counterpart in FIG. 3 will now be described in detail.

Major differences in FIG. 5 from the counterpart of FIG. 3 are as follows. That is, a power supply unit 110C is fed with power directly from the DC power supply 101 as in FIG. 1. The reverse connection protective element 140 detects the occurrence of a supply fault abnormality by measuring a difference voltage between an input side and an output side by a differential amplifier 400. The input-side voltage VIG is monitored by a comparing element 118a and the output-side voltage is monitored by a monitor element 148. The occurrence of an indirect supply fault abnormality is detected by a supply-fault determination circuit 158b. The rest of the configuration is substantially the same as those in FIGS. 1 and 3. In the respective drawings, same reference numerals denote same or equivalent portions.

Referring to FIG. 5, an in-vehicle electronic control unit 100C includes a main power supply terminal which is directly connected to a positive-electrode terminal of a DC power supply 101 that is an in-vehicle battery and therefore to which a main power supply voltage Vbb is applied, a ground terminal which is connected to a ground circuit GND that is a vehicle body to which a negative-electrode terminal of the DC power supply 101 is connected, a power supply terminal which is connected to the positive-electrode terminal of the DC power supply 101 via a manual power supply switch 102 that is, for example, an ignition switch, and therefore to which an input-side voltage VIG is applied, and a load connection terminal to which is connected an in-vehicle electrical load 103 which is one of in-vehicle electrical load groups.

In a case where the in-vehicle electronic control unit 100C is, for example, an engine control unit, the in-vehicle electrical load groups controlled by the in-vehicle electronic control unit 100C include electromagnetic valves for fuel injection, a throttle valve opening control motor, ignition coils (in the case of a gasoline engine), and the like. Power is divided and fed to apart of a large number of the in-vehicle electrical load groups from the DC power supply 101 via an output contact of an unillustrated electromagnetic relay for load power supply. The in-vehicle electrical loads fed with divided power are placed under energization control by an unillustrated control opening and closing element provided in the in-vehicle electronic control unit 100C.

Also, the power supply switch 102 feeds power also to a combination control device 190 which is, for example, a transmission control apparatus.

A power supply unit 110C is provided inside the in-vehicle electronic control unit 100C and the main power supply voltage Vbb is applied to the power supply unit 110C from the DC power supply 101. Upon supply of a power supply start-up signal DR0, the power supply unit 110C feeds power to an opening and closing command generation unit 120C by generating a control voltage Vcc, which is a predetermined stabilizing voltage, for example, of DC 5 V.

The power supply unit 110C is formed of a constant-voltage control circuit using, for example, a junction-type transistor. A base circuit is configured in such a manner that when the DC power supply 101 is connected in reversed polarity indicated by a dotted line by error, the junction-type transistor ceases conduction and no longer generates the control voltage Vcc.

A start-up transistor 111 which provides the power supply start-up signal DR0 to the power supply unit 110C is an NPN transistor that conducts current when supplied with a base current by a series circuit made up of a first drive resistor 112 and a first diode 113 when the power supply switch 102 is closed. When a logic level of a self-hold command signal DR1 generated by the opening and closing command generation unit 120C shifts to "H", a base current is supplied to the start-up transistor 111 by a series circuit made up of a second drive resistor 114 and a second diode 115. Hence, once the opening and closing command generation unit 120C starts an operation, the power supply start-up signal DR0 is maintained effective even when the power supply switch 102 is opened.

When the power supply switch 102 is opened and the self-hold command signal DR1 takes a logic level "L", the start-up transistor 111 is opened in a reliable manner by an open-circuit stabilizing resistor 116 connected between the base terminal and the emitter terminal. The comparing element 118a generates a comparison monitor signal IGC by comparing the input-side voltage VIG and a reference voltage Vref from a reference voltage source 118b and inputs this signal into the opening and closing command generation unit 120C.

A monitor element 148 which is an invert logical element using an output-side voltage of the reverse connection protective element 140 as an input signal generates a power feeding monitor signal Vd1 and inputs this signal into the opening and closing command generation unit 120C. As the reverse connection protective element 140 connected in series to the power supply switch 102 in a lower stream location, a P-channel field-effect transistor is employed as in the case of FIG. 3. A current detection resistor 147 is connected in series to the drain terminal D to which the input-side voltage VIG is applied.

It should be appreciated, however, that the current detection resistor 147 may be connected in series on the side of the source terminal S. Alternatively, depending on a manner in which to determine a determination threshold current described below, the current detection resistor 147 may be omitted and instead control may be performed dependently on an internal resistor while the reverse connection protective element 140 is conducting current between the drain terminal D and the source terminal S.

A differential amplifier 400 operates in response to a voltage across a series circuit made up of the reverse connection protective element 140 and the current detection resistor 147. A pair of clip diodes 401 connected between positive and negative input terminals, a pair of input resistors 402a and 403a respectively connected in series to the positive and negative input terminals, and a leak current interruption element 404 connected in series to the positive-side input resistor 402a are connected to the differential amplifier 400. The leak current interruption element 404 is connected via a drive resistor 405 to a drive transistor 141 which drives the reverse connection protective element 140 to close.

Also, pull-down resistors 402b and 403b which finalize potential when the leak current interruption element 404 is opened are connected to the respective input terminals of the differential amplifier 400. Hence, when the drive transistor 141 is driven by the energization command signal DR3, the reverse connection protective element 140 is driven to close. Also, a voltage in proportion to a voltage between the input and the output of the reverse connection protective element 140 including the current detection resistor 147 is inputted into a multi-channel A-to-D converter 123 in the opening and closing command generation unit 120C as a difference monitor voltage Va3 by the differential amplifier 400.

As the load opening and closing element 150 connected in series to the in-vehicle electrical load 103 on an upper stream side, a P-channel field-effect transistor is also employed as in the case of FIG. 3. The load opening and closing element 150 is controlled to open and close via a control resistor 151 by an opening and closing command signal DR2 generated by the opening and closing command generation unit 120C.

The supply fault determination circuit 158b operates on an output voltage of the control transistor 151 and an output voltage of the load opening and closing element 150 as a pair of input signals. The supply fault determination circuit 158*b* detects the occurrence of a supply fault abnormality on the ground that logic levels of a pair of the input signals exhibit "H" in a state of supply fault abnormality occurring due to a positive-side wire of the in-vehicle electrical load 103 coming in fault contact with a positive-electrode wire of the DC power supply 101 when the control transistor 151 ceases to conduct current and the load opening and closing element 150 is therefore in an open-circuit state. The supply fault determination circuit 158*b* then inputs a supply fault detection signal ERR into the opening and closing command generation unit 120C.

A supply fault abnormality 2 detected on the basis of an input and output relation of the load opening and closing element 150 as above cannot be detected when the load opening and closing element 150 is closed. When the supply fault abnormality 2 occurs, a current flows inversely to the output-side wire of the reverse connection protective element 140 independently of whether the load opening and closing element 150 is opened or closed. Hence, the supply fault abnormality 2 brings adverse effects same as those brought by the supply fault abnormality 1 occurring in the output wire of the reverse connection protective element 140.

A function and an operation of the in-vehicle electronic control unit according to the third embodiment of the invention configured as in FIG. 5 will now be described in detail with reference to flowcharts shown in FIG. 6 and FIG. 7 used to describe an operation.

Firstly, referring to FIG. 5, an input-side voltage VIG is applied when the power supply switch 102 is closed and a base current of the start-up transistor 111 is supplied via the first drive resistor 112 and the first diode 113. The start-up transistor 111 thus generates a power supply start-up signal DR0 and the power supply unit 110C starts an operation. The power supply unit 110C feeds power to the opening and closing command generation unit 120C by generating a control voltage Vcc from the main power supply voltage Vbb.

As a result, the microprocessor in the opening and closing command generation unit 120C starts an operation. The opening and closing command generation unit 120C recognizes that the power supply switch 102 is closed on the basis of the comparison monitor signal IGC which is an output signal of the comparing element 118*a* and starts a control operation described below with reference to FIG. 6 and FIG. 7.

In starting the control operation, the opening and closing command generation unit 120C generates a self-hold command signal DR1 to maintain an operation state of the start-up transistor 111 via the second drive resistor 114 and the second diode 115 and also generates an energization command signal DR3 to drive the drive transistor 141 and the leak current interruption element 404 to close.

When the power supply switch 102 and the drive transistor 141 are closed, the input-side voltage VIG is supplied to a series circuit made up of the gate resistor 144 and the drive resistor 143 via the parasitic diode 149 in the reverse connection protective element 140. The reverse connection protective element 140 starts energization in a direction from the drain terminal D on the input side to the source terminal S on the output side by a gate voltage which is a voltage across the gate resistor 144. The reverse connection protective element 140 is thus in a condition that power can be fed to the in-vehicle electrical load 103.

Herein, by shifting the logic level of the opening and closing command signal DR2 to "H" or "L", the load opening and closing element 150 conducts current or ceases to conduct current. Hence, a power feeding state to the in-vehicle electrical load 103 can be controlled. In a case where there is more than one in-vehicle electrical load 103, the opening and closing command generation unit 120C supplies an opening and closing command signal to each of the load opening and closing elements connected in series to the respective in-vehicle electrical loads.

While the opening and closing command generation unit 120C is in operation, a plurality of the in-vehicle electrical loads are driven under control and learning memory information on an operating state, information on time-dependent changes of detection characteristics of an unillustrated input sensor, or abnormality occurrence history information is written into the RAM memory 121 as needed.

When the power supply switch 102 is opened in this state, the opening and closing command generation unit 120C recognizes the opening on the basis of a logic level of the comparison monitor signal IGC and cancels the self-hold command signal DR1 after important information written into the RAM memory 121 is transferred to and written in the unillustrated non-volatile data memory or a particular region of the program memory 122C.

As a result, the start-up transistor 111 is opened and the power supply unit 110C becomes inoperable. Power feeding to the opening and closing command generation unit 120C is thus stopped.

On the other hand, in a case where the power supply switch 102 is closed after the DC power supply 101 is connected in reversed polarity as is indicated by a dotted line of FIG. 5 by error, the power supply unit 110C itself is protected by the internal circuit configuration and does not generate a control voltage Vcc. A gate voltage below a voltage at the source terminal S is not applied to the gate terminal G of the reverse connection protective element 140, either. Hence, because the reverse connection protective element 140 is in a non-conducting state, a power-supply short circuit current by a series circuit made up of the parasitic diode 159 in the load opening and closing element 150 and the freewheel diode 157 is prevented from flowing.

In the event of the supply fault abnormality 1 or the supply fault abnormality 2 due to the positive-side wire of the in-vehicle electrical load 103 which is the output wire of the reverse connection protective element 140 or the output wire of the load opening and closing element 150 coming in fault contact with the positive-electrode wire of the DC power supply 101 when the opening and closing command generation unit 120C is in normal operation in a state where the DC power supply 101 is connected in proper polarity and the power supply switch 102 is closed, sneaking of the supply-fault power supply occurs via the parasitic diode 159 in the load opening and closing element 150 independently of whether the load opening and closing element 150 is opened or closed in the case of the fault supply abnormality 2 let alone the fault supply abnormality 1. Hence, the reverse connection protective element 140 maintains a close-circuit state even when the power supply switch 102 is opened later. The supply-fault power supply therefore feeds power to the combination control device 190 by sneaking in an inverse direction from the source terminal S to the drain terminal D of the reverse connection protective element 140. Also, the opening and closing command generation unit 120C can no longer recognize that the power switch 102 is opened on the basis of the comparison monitor signal IGC. The opening and closing command generation unit 120C thus maintains an operating state.

To avoid this problem, the opening and closing command generation unit 120C of the third embodiment monitors a difference monitor voltage Va3 which is an output signal of the differential amplifier 400 and opens the reverse connection protective element 140 when the difference monitor voltage Va3 drops to or below a predetermined value by assuming that a supply fault abnormality is occurring.

As a result, in a case where the power feeding voltage is generated by the monitor element 148 when the comparison monitor signal IGC takes a logic level "L" and the input-side voltage VIG has a value equal to or less than the predetermined value, the opening and closing command generation unit 120C specifies that a supply fault abnormality is occurring. The opening and closing command generation unit 120C therefore stops the self-hold command signal DR1 after the abnormality occurrence history information is transferred to and saved in the unillustrated non-volatile data memory or a partial region of the program memory 122C.

When the comparison monitor signal IGC takes a logic level "H" after the reverse connection protective element 140 is opened, it means that the power supply switch 102 is still closed. When the power feeding voltage is also generated on the output side of the reverse connection protective element 140 in this instance, it can be determined that power is fed via the parasitic diode 149 in the reverse connection protective element 140. Hence, even when the supply fault abnormality is occurring, it is impossible to detect the supply fault abnormality in this state.

Even when a supply fault abnormality is occurring in the output wire of the reverse connection protective element 140 or the output wire of the load opening and closing element 150 while the power supply switch 102 is opened, because the drive transistor 141 is in a non-conducting state, the reverse connection protective element 140 is in an open-circuit state. The fault-supply power supply therefore does not flow inversely to the input side of the reverse connection protective element 140.

Figure 6:
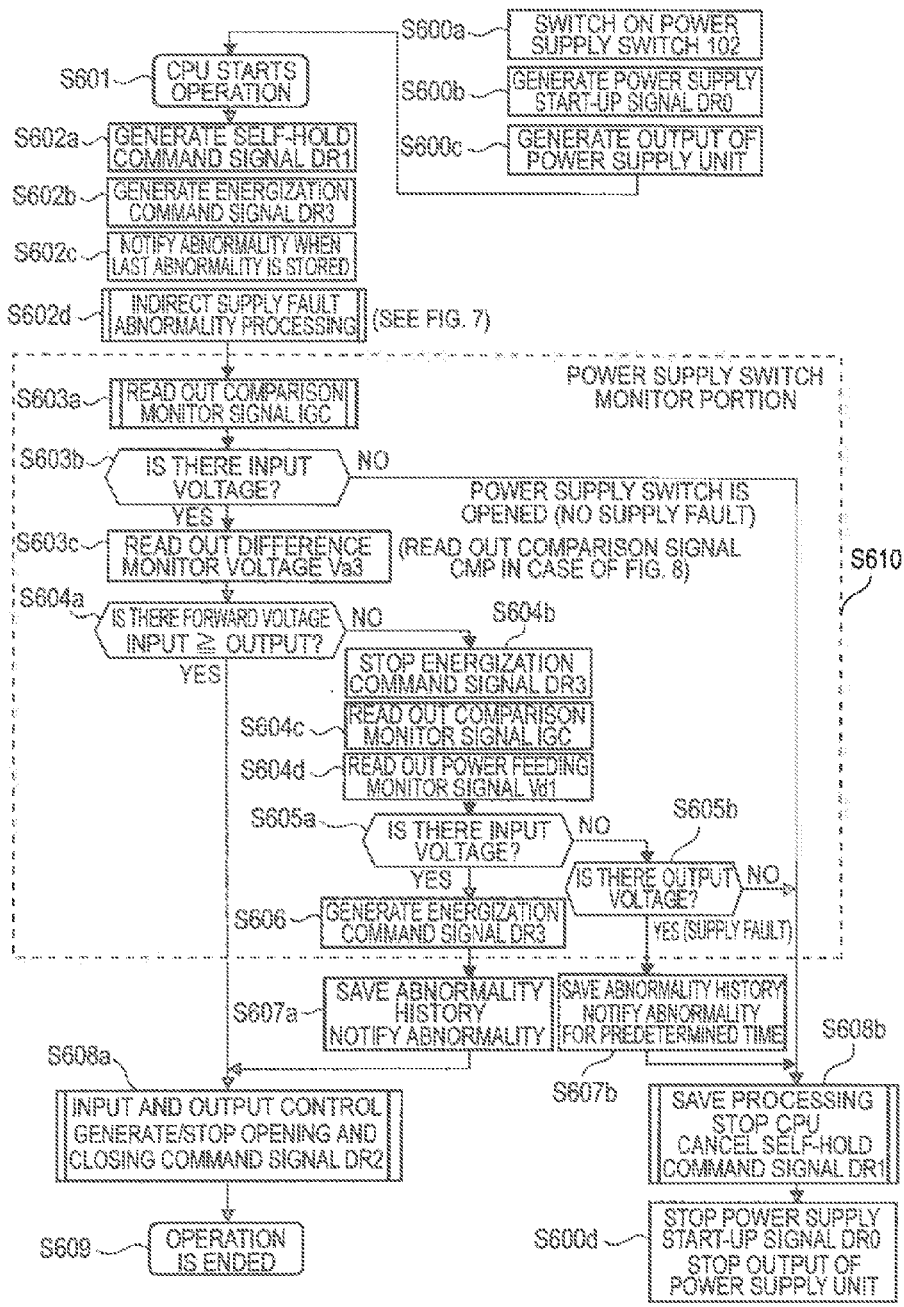
FIG. 6 is a view showing a flowchart used to describe an operation by the overall circuit diagram of FIG. 5.

FIG. 6 showing a flowchart used to describe an operation by the circuit configuration of FIG. 5 will now be described.

Referring to FIG. 6, Step S600*a* is a step in which the power supply switch 102 is closed and thereby switched ON in the opening and closing command generation unit 120C connected as in FIG. 5. Subsequent Step S600*b* is a step in which the start-up transistor 111 generates the power supply start-up signal DR0 as the power supply switch 102 is closed. Subsequent Step S600*c* is a step in which, because the main power supply voltage Vbb is applied, the power supply unit 110C feeds power to the opening and closing command generation unit 120C by generating a control voltage Vcc.

Subsequent Step S601 is a step in which the microprocessor is started because power is fed to the opening and closing command generation unit 120C and opening and closing control of the load opening and closing element 150 connected in series to the electrical load group is started according to a content of the control program stored in the program memory 122C and in response to an operating state of an unillustrated input signal.

Subsequent Step S602*a* is a step in which the self-hold command signal DR1 for the start-up transistor 111 is generated so that a conducting state of the start-up transistor 111 is maintained even when the power supply switch 102 is opened. Subsequent Step S602*b* is a step in which the energization command signal DR3 for the drive transistor 141 is generated to drive the reverse connection protective element 140 to close. Subsequent Step S602*c* is a step in which a content of the non-volatile data memory is read out and an abnormality is notified in a case where a supply fault abnormality had occurred when the operation was stopped last time.

Subsequent Step Block S602*d* is a processing step relating to an indirect supply fault abnormality described below with reference to FIG. 7. In Step Block S602*d*, the opening and closing command generation unit 120C monitors an output voltage of the load opening and closing element 150 each time it is opened to determine whether or not an indirect supply fault abnormality is occurring. Upon detection of the indirect supply fault abnormality, the opening and closing command generation unit 120C determines whether the power supply switch 102 is opened by opening the reverse connection protective element 140. Also, upon detection of the indirect supply fault abnormality, the opening and closing command generation unit 120C forcedly closes the load opening and closing element 150 until an open-circuit command is generated next time.

Subsequent Step S603*a* is a step from which advancement is made to Step S603*b* after a logic state of the comparison monitor signal IGC is read out. Step S603*b* is a determination step in which a determination is made as to whether the input-side voltage VIG is generated on the basis of the logic level of the comparison monitor signal IGC. When the input-side voltage VIG has a value equal to or greater than the predetermined value, the presence of the input-side voltage VIG is determined and advancement is made to Step S603*c* by making a determination of YES. When the input-side voltage VIG has a value less than the predetermined value, the absence of the input-side voltage VIG is determined and advancement is made to Step Block S608*b* by making a determination of NO.

Step S603*c* is a step from which advancement is made to Step S604*a* after a value of the difference monitor voltage Va3 is read out. It should be noted, however, that a current comparison signal CMP described below is read out instead of the difference monitor voltage Va3 in a fourth embodiment shown in FIG. 8 and described below.

Step S604*a* is a determination step in which the difference monitor voltage Va3 and a predetermined threshold voltage are compared and when at least the input-side voltage VIG is as high as or higher than the output-side voltage, advancement is made to Step Block S608*a* by making a determination of YES. When the input-side voltage VIG is lower than the output-side voltage, advancement is made to Step S604*b* by making a determination of NO.

Step S604*b* is a step in which the reverse connection protective element 140 is opened by stopping the energization command signal DR3 generated in Step S602*b*. Subsequent S604*c* is a step from which advancement is made to Step S604*d* after the value of the comparison monitor signal IGC is read out again. Step S604*d* is a step from which advancement is made to Step S605*a* after the logic state of the power feeding monitor signal Vd1 is read out. Step S605*a* is a determination step in which a determination is made as to whether the input-side voltage VIG is generated on the basis of the logic level of the comparison monitor signal IGC read out in Step S604*c*. When the value of the input-side voltage VIG is equal to or greater than the predetermined value, the presence of the input-side voltage VIG is determined and advancement is made to Step S606 by making a determination of YES. When the value of the input-side voltage VIG is less than the predetermined value, the absence of the input-side voltage VIG is determined and advancement is made to Step S605*b* by making a determination of NO.

Step S605*b* is a determination step in which a determination is made as to whether an output-side voltage of the reverse connection protective element 140 is generated on the basis of the logic level of the power feeding monitor voltage Vd1 read out in Step S604*d*. When the logic level exhibits "L", the presence of the output-side voltage is determined and advancement is made to Step S607*b* by making a determination of YES. When the logic level exhibits "H", the absence of the output-side voltage is determined and advancement is made to Step Block S608b by making a determination of NO.

A determination of YES is made in Step S605a in a case where a close-circuit state of the power supply switch 102 is continuing. The energization command signal DR3 stopped in Step S604b is generated again in Step S606, according to which signal the reverse connection protective element 140 is driven to close. A period from Step S604b to Step S606 is a partial period of the entire period circulating from operation starting Step S601 to operation ending Step S609. Hence, a time over which to open the reverse connection protective element 140 is limited to an extremely short period.

A determination of YES is made in Step S605b in a state where an output-side voltage of the reverse connection protective element 140 is generated in the absence of an input-side voltage VIG, that is, when a supply fault abnormality is occurring. Hence, supply fault abnormality occurrence information is written into the RAM memory 121 in Step S607b and advancement is made to Step Block S608b after the abnormality is notified for a predetermined time.

Step Block S608a is an input and output control block during normal operation in which the opening and closing command signal DR2 for the load opening and closing element 150 is generated or stopped. Advancement is made from Step Block S608a to operation ending Step S609. Operation ending Step S609 is a step from which return is made to operation starting Step S601 after a cycle time, for example, of 10 msec at the latest since the other control programs were performed, so that Step S601 and subsequent steps are repetitively performed.

In Step Block S608b performed when a determination of NO is made in Step S603b or Step S605b, that is, in a state where it is determined that the power supply switch 102 is opened, the self-hold command signal DR1 is cancelled after learning information and abnormality occurrence information written into the RAM memory 121 are transferred to and saved in the non-volatile data memory. In subsequent Step S600d, the power supply start-up signal DR0 is stopped so that an operation of the power supply unit 110C is stopped. Step Block S610 made up of Step S603a through Step S606 forms a power supply switch monitor portion. The content shown in Step Block S610 can be created by hardware using a logical element without depending on the microprocessor.

Figure 7:
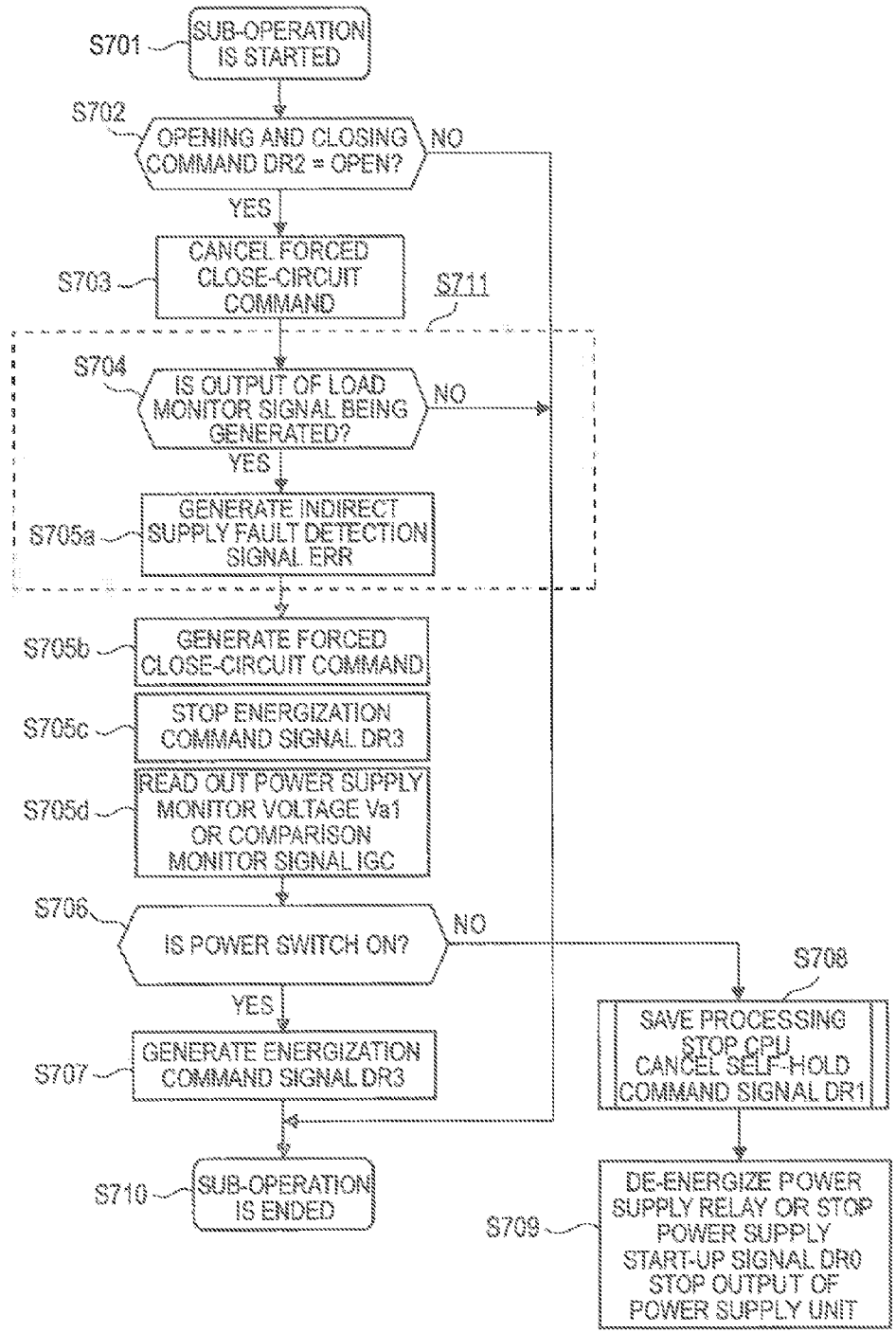
FIG. 7 is a view showing a flowchart used to describe a part of the operations of FIG. 4 and FIG. 6.

FIG. 7 showing a flowchart used to describe an operation relating to the indirect supply fault abnormality processing described in Step Blocks S402d and S602d in FIG. 4 and FIG. 6, respectively, will now be described.

Referring to FIG. 7, Step S701 is a starting step of a sub-routine program which is the starting step of Step Block S402d or S602d described above. Subsequent Step S702 is a step in which a logic state of the opening and closing command signal DR2 for the load opening and closing element 150 is determined. When the logic level of the opening and closing command signal DR2 exhibits "L", a determination is made as to whether an open-circuit command for the load opening and closing element 150 is generated. When it is determined that the open-circuit command is generated, advancement is made to Step S703 by making a determination of YES. When the logic level of the opening and closing command signal DR2 exhibits "H" and a close-circuit command for the load opening and closing element 150 is generated, advancement is made to Step S710 which is the ending step of the sub-routing program by making a determination of NO.

Step S703 is a step in which a forced close-circuit command for the load opening and closing element 150 generated in Step S705b described below is cancelled. Subsequent Step S704 is a determination step in which a logic state of the load voltage monitor element 158a in the second embodiment above shown in FIG. 3 is monitored. When the logic level of the load monitor signal Vd2 exhibits "L" and an output voltage of the load opening and closing element 150 is generated, advancement is made to Step S705a by making a determination of YES. When the logic level of the load monitor signal Vd2 exhibits "H" and an output voltage of the load opening and closing element 150 is not generated, advancement is made to Step S710 by making a determination of NO.

Step S705a is a step in which it is determined that an indirect supply fault abnormality is occurring in the output wire of the load opening and closing element 150 on the ground that the presence of the output voltage of the load opening and closing element 150 is determined in Step S704 in spite of the determination in Step S702 that an open-circuit command for the load opening and closing element 150 is generated. Hence, advancement is made to Step S705b after the supply fault detection signal ERR is generated.

In the case of the third embodiment shown in FIG. 5, Step block 5711 made up of Step S704 and Step S705a is performed by the supply fault determination circuit 158b. Upon the occurrence of an indirect supply fault abnormality, the supply fault determination circuit 158b generates the supply fault detection signal ERR and inputs this signal into the opening and closing command generation unit 120C. The microprocessor in the opening and closing command generation unit 120C monitors an operating state of the supply fault detection signal ERR continuously from Step S703. When the supply fault detection signal ERR is generated, advancement is made to Step S705b and advancement is made to Step S710 when a supply fault detection signal ERR is not generated.

Step S705b is a step in which the opening and closing command signal DR2 for the load opening and closing element 150 is forcedly changed to a close-circuit command which takes a logic level "H" to prevent overheating and burnout of the parasitic diode 159 that occur when the indirect supply-fault power supply generated in the output wire of the load opening and closing element 150 sneaks into the input side of the load opening and closing element 150 via the parasitic diode 159.

Subsequent Step S705c is a step in which the energization command DR3 for the reverse connection protective element 140 is stopped temporarily, so that the open and close states of the power supply switch 102 are detected in the subsequent steps. Subsequent Step S705d is a step in which the power supply monitor voltage Va1 is read out in the case of the second embodiment above shown in FIG. 3 and the comparison monitor signal IGC is read out in the case of the third embodiment shown FIG. 5.

Subsequent Step S706 is a step in which a determination is made as to the presence or absence of the input-side voltage VIG on the basis of the voltage level of the power supply monitor voltage Va1 or the logic state of the comparison monitor signal IGC read out in Step S705d. When the input-side voltage VIG has a value equal to or greater than the predetermined value, advancement is made to Step S707 by making a determination of YES, which means that the power supply switch 102 is closed. When the input-side voltage VIG has a value less than the predetermined value, advancement is made to Step S708 by making a determination of NO, which means that the power supply switch 102 is opened.

Step S707 is a step in which the energization command signal DR3 stopped in Step S705c is generated to drive the reverse connection protective element 140 to close, after which advancement is made to Step S710 which is the ending step of the sub-routine program. In Step Block 708 performed when the determination in Step S706 is NO, that is, in a state where it is determined that the power supply switch 102 is opened, the self-hold command signal DR1 is cancelled after learning information and abnormality occurrence information written into the RAM memory 121 are transferred to and saved in the non-volatile data memory.

Subsequent Step S709 is a step in which the output contact 104a is opened by de-energizing the exciting coil 104b of the power supply relay in the case of the second embodiment of FIG. 3 and the power supply start-up signal DR0 is stopped so that an operation of the power supply unit 110C is stopped in the case of the third embodiment of FIG. 5.

Step Block 5711 made up of Step S703 through Step S705b relates to forced close-circuit control for the load opening and closing element 150. The forced close-circuit control can be created by a logic circuit without depending on the microprocessor.

Fourth Embodiment

Figure 8:
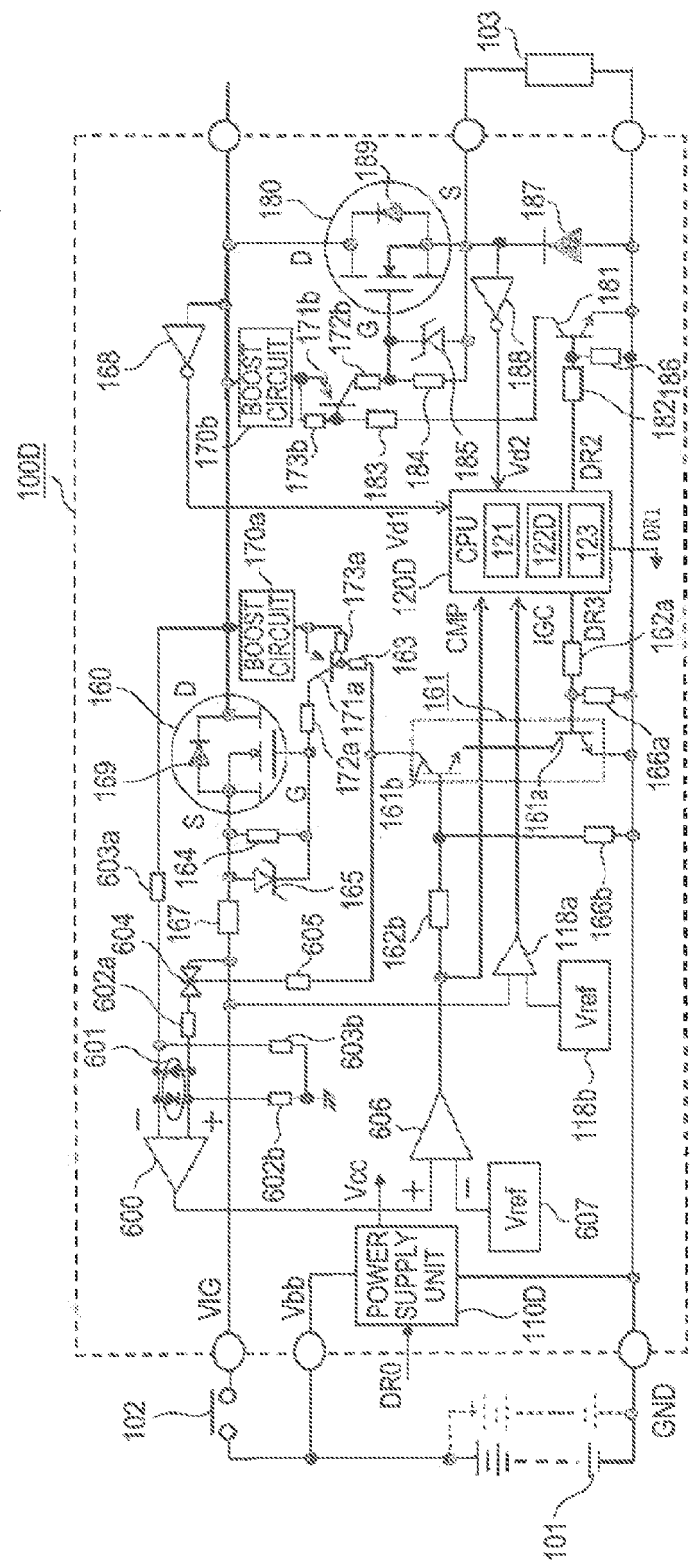
FIG. 8 is an overall circuit diagram of an in-vehicle electronic control unit according to a fourth embodiment of the invention.

With reference to FIG. 8 showing an overall circuit configuration of an in-vehicle electronic control unit according to a fourth embodiment of the invention, a configuration chiefly focused on differences from the counterpart in FIG. 5 will now be described in detail.

FIG. 8 shows a slight modification of FIG. 5. Major differences in FIG. 8 from the counterpart of FIG. 5 are as follows. That is, N-channel field-effect transistors are employed as a reverse connection protective element 160 and a load opening and closing element 180. A comparison determination element 606 is additionally provided to an output circuit of a differential amplifier 600 which operates in response to a voltage across the reverse connection protective element 160. The rest of the configuration is substantially the same as that in FIG. 5. In the respective drawings, same reference numerals denote same or equivalent portions.

In order to connect an N-channel field-effect transistor in a location upstream of the in-vehicle electrical load, a boost circuit is required to obtain gate potential higher than source potential. Hence, a gate voltage applying circuit is also a difference. The boost circuit and the gate voltage apply circuit will be described in detail below.

Referring to FIG. 8, an in-vehicle electronic control unit 100D includes a main power supply terminal which is directly connected to a positive-electrode terminal of a DC power supply 101 that is an in-vehicle battery as in the case of FIG. 5 and therefore to which a main power supply voltage Vbb is applied, a ground terminal which is connected to aground circuit GND that is a vehicle body to which a negative-electrode terminal of the DC power supply 101 is connected, a power supply terminal which is connected to the positive-electrode terminal of the DC power supply 101 via a manual power supply switch 102 that is, for example, an ignition switch, and therefore to which an input-side voltage VIG is applied, and a load connection terminal to which is connected an in-vehicle electrical load 103 which is one of in-vehicle electrical load groups.

A power supply unit 110D is provided inside the in-vehicle electronic control unit 100D and the main power supply voltage Vbb is applied to the power supply unit 110D from the DC power supply 101. Upon supply of a power supply start-up signal DR0, the power supply unit 110D feeds power to an opening and closing command generation unit 120D by generating a control voltage Vcc, which is a predetermined stabilizing voltage, for example, of DC 5 V. In FIG. 8, an input side of the power supply unit 110D is omitted.

When the power supply switch 102 is closed and the input-side voltage VIG is applied, power is fed to the in-vehicle electrical load 103 by way of a current detection resistor 167, the reverse connection protective element 160 from the source terminal S to the drain terminal D, and further the load opening and closing element 180 from the drain terminal D to the source terminal S. A parasitic diode 169 which conducts current in a direction from the source terminal S to the drain terminal D is formed inside the reverse connection protective element 160. A parasitic diode 189 which conducts current in a direction from the source terminal S to the drain terminal D is formed inside the load opening and closing element 180.

A drive transistor 161 is used to drive the reverse connection protective element 160 to close, and is formed of a first transistor 161a and a second transistor 161b which are NPN transistors connected in series to each other. The first transistor 161a is driven by an energization command signal DR3 generated by the opening and closing command generation unit 120D via a base resistor 162a.

The boost circuit 170a and a series circuit made up of a power feeding transistor 171a and a collector resistor 172a used to apply a boost voltage generated by the boost circuit 170a to the gate terminal G are connected in series between the drain terminal D and the gate terminal G of the reverse connection protective element 160. When the drive transistor 161 is closed, the power feeding transistor 171a is driven to close via a drive resistor 163. The reverse connection protective element 160 is thus changed to a conducting state.

A gate resistor 164 and a constant voltage diode 165 are connected in parallel between the gate terminal G and the source terminal S of the reverse connection protective element 160. An open-circuit stabilizing resistor 166a is connected between the base terminal and the emitter terminal of the first transistor 161a. An open-circuit stabilizing resistor 166b is connected between the base terminal of the second transistor 161b and the ground circuit GND. An open-circuit stabilizing resistor 173a is connected between the emitter terminal and the base terminal of the power feeding transistor 171a which is a PNP transistor.

A differential amplifier 600 operates in response to a voltage across a series circuit made up of the reverse connection protective element 160 and the current detection resistor 167. A pair of clip diodes 601 connected between positive and negative input terminals, a pair of input resistors 602a and 603a respectively connected in series to the positive and negative input terminals, and a leak current interruption element 604 connected in series to the positive-side input resistor 602a are connected to the differential amplifier 600. The leak current interruption element 604 is connected via a drive resistor 605 to a drive transistor 161 which drives the reverse connection protective element 160 to close.

Also, pull-down resistors 602b and 603b which finalize potential when the leak current interruption element 604 is opened are connected to the respective input terminals of the differential amplifier 600. Hence, when the drive transistor 161 is driven by the energization command signal DR3, the reverse connection protective element 160 is driven to close. Also, a voltage in proportion to a voltage between the input and the output of the reverse connection protective element 160 including the current detection resistor 167 is inputted to one input terminal of the comparing circuit 606 by the differential amplifier 600. A current comparison signal CMP which is a comparison determination result with a reference voltage Vref from a reference voltage source 607 and inputted into the other input terminal of the comparing circuit 606 is inputted to a multi-channel A-to-D converter 123 in the opening and closing command generation unit 120D.

An output of the comparing circuit 606 is connected to the base terminal of the second transistor 161b via the base resistor 162b. The comparing circuit 606 drives the second transistor 161b to close when the amplified voltage in proportion to a power feeding current generated in the series circuit made up of the current detection resistor 167 and the reverse connection protective element 160 becomes as high as or higher than a predetermined threshold voltage set by the reference voltage source 607 by shifting a logic level of the comparison determination output to "H".

Hence, when a power feeding current flowing in a direction from the source terminal S to the drain terminal D of the reverse connection protective element 160 drops, for example, below 100 mA, the second transistor 161b is opened and when the power feeding current is as high as or higher than 100 mA, the second transistor 161b is closed. Herein, assume a light load state in which a current flowing to the reverse connection protective element 160 is, for example, about 50 mA when the energization command signal DR3 is generated and the reverse connection protective element 160 is therefore driven to close. Then, when the reverse connection protective element 160 is closed, an output voltage of the differential amplifier 600 is so small that the second transistor 161b is opened and hence the reverse connection protective element 160 is opened. The power feeding current of 50 mA is thus fed via the parasitic diode 169. Accordingly, an input voltage of the differential amplifier 600 is increased and the second transistor 161b is driven to close again. This intermittent state is maintained thereafter.

However, because a current flowing to the reverse connection protective element 160 is small and so is a voltage across the reverse connection protective element 160, heat generation of the reverse connection protective element 160 is small and an excessive temperature rise does not occur. On the other hand, in a case where a power feeding current flowing to the reverse connection protective element 160 has a sufficiently large value, the second transistor 161b is constantly in a close-circuit state. The reverse connection protective element 160 is therefore closed in a stable manner without interruption. Conversely, when a voltage on the side of the drain terminal D of the reverse connection protective element 160 rises as high as or higher than a voltage on the source terminal S side due to the occurrence of a supply fault abnormality, the second transistor 161b is changed to an open-circuit state constantly. The reverse connection protective element 160 thus maintains an open-circuit state.

The comparing element 118a generates a comparison monitor signal IGC by comparing the input-side voltage VIG with the reference voltage from the reference voltage source 118b and inputs this signal into the opening and closing command generation unit 120D. Hence, by monitoring the logic level of the comparison monitor signal IGC while the reverse connection protective element 160 is opened, it becomes possible to determine whether the power supply switch 102 is opened.

Also, a monitor element 168 which is an invert logical element using an output-side voltage of the reverse connection protective element 160 as an input signal generates a power feeding monitor signal Vd1 and inputs this signal to the opening and closing command generation unit 120D. Hence, by monitoring the logic level of the power feeding monitor signal Vd1 while the power supply switch 102 and the reverse connection protective element 160 are opened, it becomes possible to determine whether a supply fault abnormality is occurring.

A load opening and closing element 180 connected in series to the in-vehicle electrical load 103 in an upper stream side is controlled to open and close by an opening and closing command signal DR2 generated by the opening and closing command generation unit 120D via a control transistor 181 which is driven to conduct current via a base resistor 182. The boost circuit 170b and a series circuit made up of the power feeding transistor 171b and the collector resistor 172b used to apply a boost voltage generated by the boost circuit 170b to the gate terminal G are connected in series between the drain terminal D and the gate terminal G of the load opening and closing element 180. When the drive transistor 181 is closed, the power feeding transistor 171b is driven to close via a drive resistor 183. The load opening and closing element 180 is thus changed to a conducting state. A gate resistor 184 and a constant voltage diode 185 are connected in parallel between the gate terminal G and the source terminal S of the load opening and closing element 180.

A load voltage monitor element 188 as an invert logical element generates a load monitor signal Vd2 taking a logic level "L" when the load opening and closing element 180 is closed and inputs this signal into the opening and closing command generation unit 120D. Hence, when the logic level of the opening and closing command signal DR2 shifts to "H" and the load opening and closing element 180 is closed, it is normal that the logic level of the load monitor signal Vd2 shifts to "L". Also, when the logic level of the opening and closing command signal DR2 shifts to "L" and the load opening and closing element 180 is opened, it is normal that the logic level of the load monitor signal Vd2 shifts to "H". In a case where the logic level of the load monitor signal Vd2 exhibits "L" in this instance, it means that a supply fault abnormality is occurring due to the positive-side wire of the in-vehicle electrical load 103 coming in fault contact with the positive-electrode wire of the DC power supply 101.

A function and an operation of the configuration shown in FIG. 8 have been described with reference to FIG. 6 above, and a difference is that the current comparison signal CMP is read out in Step S603c of FIG. 6 instead of the difference monitor voltage Va3. Also, the load monitor signal Vd2 is handled in a manner as has been described in Step S704 and S705a of FIG. 7.

Gist and Characteristic of Third Embodiment and Fourth Embodiment

As can be obvious from the description above, the in-vehicle electronic control units 100C and 100D according to the third embodiment and the fourth embodiment of the invention, respectively, include: the load opening and closing elements 150 and 180, respectively, which are connected in series to a part or all of in-vehicle electrical load groups fed with power from the DC power supply 101; the opening and closing command generation units 120C and 120D, respectively, which supply an opening and closing command signal DR2 to the load opening and closing elements 150 and 180, respectively, according to a driving condition of a vehicle; and the power supply units 110C and 110D, respectively, which feed power to the opening and closing command generation units 120C and 120D, respectively, by generating a predetermined stabilizing voltage when fed with power from the DC power supply 101 in response to the manual power supply switch 102 which is now closed, wherein the power supply switch 102 feeds power to the in-vehicle electrical load 103 which is the part or all of the in-vehicle electrical load groups via the reverse connection protective elements 140 and 160, respectively. The opening and closing command generation units 120C and 120D generate a self-hold command signal DR1 once the power supply switch 102 is closed and power is fed from the power supply units 110C and 110D, respectively, so that a power feeding operation by the power supply units 110C and 110D, respectively, is maintained even when the power supply switch 102 is opened. The reverse connection protective elements 140 and 160 are field-effect transistors which include the parasitic diodes 149 and 169, respectively, and are configured in such a manner that a gate voltage is applied by the drive transistors 141 and 161, respectively, so that the reverse connection protective elements 140 and 160 are driven to close in a direction same as an energization direction of the parasitic diodes 149 and 169, respectively, when the DC power supply 101 is connected in proper polarity, whereas the reverse connection protective elements 140 and 160 do not conduct current when the DC power supply 101 is connected in reversed polarity by error and when the power supply units 110C and 110D, respectively, stop feeding power.

The opening and closing command generation units 120C and 120D receive an input of a monitor signal IGC which is used to monitor the input-side voltage VIG of the reverse connection protective elements 140 and 160, respectively, which is an output voltage of the power supply switch 102, and to determine that the power supply switch 102 is opened when the input-side voltage VIG has a value less than a predetermined value. The opening and closing command generation units 120C and 120D confirm the open and close states of the power supply switch 102 even when the input-side voltage VIG is as high as or higher than a voltage of the predetermined value by monitoring the input-side voltage VIG while the reverse connection protective elements 140 and 160, respectively, are opened, and stop power feeding by the power supply units 110C and 110D, respectively, by cancelling the self-hold command signal DR1 after a predetermined delay time upon detection of an open-circuit state of the power supply switch 102. The drive transistors 141 and 161 are changed to an open-circuit state when the power feeding by the power supply units 110C and 110D, respectively, stop and the reverse connection protective elements 140 and 160, respectively, are changed to an open-circuit state even when a supply fault abnormality is occurring due to fault contact between output wires of the reverse connection protective elements 140 and 160, respectively, and a positive-electrode wire of the DC power supply 101, so that the power supply units 110C and 110D, respectively, are not started again while the power supply switch 102 is opened.

In the case of the third embodiment above, the reverse connection protective element 140 controlled to open and close by the opening and closing command generation unit 120C is controlled to open and close via the drive transistor 141 in response to a difference monitor voltage Va3 in proportion to a difference value between the input-side voltage VIG and the output-side voltage. The reverse connection protective element 140 is driven to close on the ground that a power feeding current as high as or higher than a predetermined threshold current is flowing in a conduction direction of the parasitic diode 149, and a close-circuit command is cancelled at least when the input-side voltage VIG is as high as or lower than the output-side voltage.

In the case of the fourth embodiment above, the reverse connection protective element 160 controlled to open and close by the opening and closing command generation unit 120D is controlled to open and close via the drive transistor 161 in response to a voltage in proportion to an output current of the reverse connection protective element 160. The reverse connection protective element 160 is driven to close on the ground that a power feeding current as high as or higher than a predetermined threshold current is flowing in a conduction direction of the parasitic diode 169, and a close-circuit command is cancelled at least when the input-side voltage VIG is as high as or lower than the output-side voltage.

As has been described, in conjunction with claim 4 of the invention, signal voltages on the input side and on the output side of the reverse connection protective element are compared relatively with each other. When the input-side voltage is not higher than the output-side voltage, the reverse connection protective element is opened. Then, it is determined that the power supply switch is closed when the input-side voltage is generated. It is determined that the power supply switch is opened when neither the input-side voltage nor the output-side voltage is generated. When the output-side voltage is generated but the input-side voltage is not, it is determined that the power supply switch is opened but a supply fault abnormality is occurring.

Hence, there is no need to periodically open and close the reverse connection protective element. Because the open and close states of the power supply switch can be detected by constantly closing the reverse connection protective element until a supply fault abnormality occurs, a loss of power accompanying the opening and closing of the reverse connection protective element does not occur during a normal operation. Hence, there is a characteristic that a temperature rise of the reverse connection protective element can be suppressed.

In a case where an imperfect supply fault abnormality having a resistance component occurs, the output-side voltage of the reverse connection protective element is not necessarily as high as or higher than the input-side voltage when the power supply switch is closed. However, when the power supply switch is opened while a supply fault abnormality, even in an imperfect form, is occurring, the output-side voltage of the reverse connection protective element becomes as high as or higher than the input-side voltage without fail. Hence, a supply fault abnormality can be detected in a reliable manner by opening the reverse connection protective element in this instance, which makes it possible to immediately detect that the power supply switch is opened.

In the case of the third embodiment above, the differential amplifier 400 is connected to the opening and closing command generation unit 120C. The differential amplifier 400 detects a normal feed direction voltage generated when the input-side voltage VIG of the revere connection protective element 140 exceeds the output-side voltage in response to a voltage across the reverse connection protective element 140, a voltage across the current detection resistor 147 connected in series to the reverse connection protective element 140, or a difference monitor voltage Va3 in proportion to a voltage across a series circuit made up of the reverse connection protective element 140 and the current detection resistor 147. The reverse connection protective element 140 is driven to close via the drive transistor 141 on the ground that an output signal voltage of the differential amplifier 400 has a value equal to or greater than a predetermined value corresponding to the threshold current.

In the case of the fourth embodiment above, the differential amplifier 600 is connected to the opening and closing command generation unit 120D. The differential amplifier 600 detects a normal feed direction voltage generated when the input-side voltage VIG of the revere connection protective element 160 exceeds the output-side voltage in response to a voltage across the reverse protective element 160, a voltage across the current detection resistor 167 connected in series to the reverse connection protective element 160, or a voltage across a series circuit made up of the reverse connection protective element 160 and the current detection resistor 167. The reverse connection protective element 160 is driven to close via the drive transistor 161 on the ground that an output signal voltage of the differential amplifier 600 has a value equal to or greater than a predetermined value corresponding to the threshold current.

As has been described, in conjunction with claim 5 of the invention, a difference voltage between the input-side voltage and the output-side voltage of the reverse connection protective element is measured directly. When the input-side voltage exceeds the output-side voltage, the reverse connection protective element is driven to close. Hence, there is a characteristic that it is possible to detect that the power supply switch is opened on the ground that the input-side voltage of the reverse connection protective element is no longer generated when the power supply switch is opened independently of whether or not a supply fault abnormality is occurring in the output wire.

Input terminals of the differential amplifiers 400 and 600 are connected to each other by pairs of clip diodes 401 and 601, respectively. The respective input terminals are connected to both ends of a measured constant voltage used to measure the difference monitor voltage Va3 via the input resistors 402a and 403a, respectively, and the input resistors 602a and 603a, respectively. The leak current interruption elements 404 and 604 are connected in series to the input resistors 402a and 602a, respectively, on the positive input side. The leak current interruption elements 404 and 604 are closed as the drive transistors 141 and 161, respectively, are driven to close, and interrupted when the reverse connection protective elements 140 and 160, respectively, are opened.

As has been described, in conjunction with claim 6, the input circuit of the differential amplifier is protected by the input resistors and the clip diodes, so that an overvoltage is not applied. Also, the input circuit is interrupted by the leak current interruption element when the reverse connection protective element is opened. Hence, there is a characteristic that in a case where the power supply switch is left open while a supply fault abnormality is occurring, a discharge of the DC power supply can be suppressed. Also, in a case where the power supply switch is left open while a supply fault abnormality is occurring, there is a problem that it is impossible to detect that the power supply switch is opened by merely opening the reverse connection protective element, because a voltage monitor signal or a power supply monitor voltage is generated by a sneaking voltage from the input circuit of the differential amplifier. This problem, however, can be solved by the configuration above.

The load opening and closing element 180 is a field-effect transistor located upstream of the in-vehicle electrical load 103 and connected to the reverse connection protective element 160 in a lower stream location. The opening and closing command generation unit 120D receives an input of a load monitor signal Vd2 used to monitor an output voltage of the load opening and closing element 180. The opening and closing command generation unit 120D monitors the load monitor signal Vd2 each time the opening and the closing command generation unit 120D changes the opening and closing command signal DR2 for the load opening and closing element 180 to an open-circuit command, and determines that an indirect supply fault abnormality is occurring due to an output wire of the load opening and closing element 180 coming in fault contact with the positive-electrode wire of the DC power supply 101 when the output voltage of the load opening and closing element 180 is generated. The opening and closing command generation unit 120D further generates an open-circuit command for the reverse connection protective element 160 upon detection of the occurrence of the indirect supply fault abnormality to determine whether the power supply switch 102 is opened, and immediately drives the reverse connection protective element 160 to close when the power supply switch 102 is closed.

As has been described, in conjunction with claim 7 of the invention, the opening and closing command generation unit determines whether or not an indirect supply fault abnormality is occurring by monitoring an output voltage of the load opening and closing element each time the load opening and closing element is opened. Upon detection of the indirect supply fault abnormality, the opening and closing command generation unit determines whether the power supply switch is opened by opening the reverse connection protective element. Hence, in the electronic control unit of a type in which the output wire of the reverse connection protective element is not directly pulled outside, the open and close states of the power supply switch can be detected by constantly closing the reverse connection protective element until an indirect supply fault abnormality occurs. Therefore, a loss of power accompanying the opening and closing of the reverse connection protective element does not occur during a normal operation. Hence, there is a characteristic that a temperature rise of the reverse connection protective element can be suppressed. In particular, in the electronic control unit of a type in which the load opening and closing element is opened and closed frequently, the occurrence of an indirect supply fault abnormality can be detected quickly.

The load opening and closing element 150 is a field-effect transistor located upstream of the in-vehicle electrical load 103 and connected to the reverse connection protective element 140 in a lower stream location, and provided with the supply fault determination circuit 158b which determines whether or not an indirect supply fault abnormality is occurring due to an output wire of the load opening and closing element 150 coming in fault contact with the positive-electrode wire of the DC power supply 101 by monitoring an output voltage of the load opening and closing element 150 each time a close-circuit drive command for the load opening and closing element 150 is cancelled. The opening and closing command generation unit 120C generates an open-circuit command for the reverse connection protective element 140 when the supply fault determination circuit 158b detects the indirect supply fault abnormality to determine whether the power supply switch 102 is opened, and immediately drives the reverse connection protective element 140 to close when the power supply switch 102 is closed.

As has been described, in conjunction with claim 8 of the invention, whether or not a supply fault abnormality is occurring in the output wire of the load opening and closing element is determined by the supply fault determination circuit each time the load opening and closing element is opened. A determination is made as to whether the power supply switch is opened by opening the reverse connection protective element when an indirect supply fault abnormality is detected. Hence, in the electronic control unit of a type in which the output wire of the reverse connection protective element is not directly pulled outside, the open and close states of the power supply switch can be detected by constantly closing the reverse connection protective element until an indirect supply fault abnormality occurs. Therefore, a loss of power accompanying the opening and closing of the reverse connection protective element does not occur during a normal operation. Hence, there is a characteristic that a temperature rise of the reverse connection protective element can be suppressed. In particular, in the electronic control unit of a type in which the load opening and closing element is opened and closed frequently, the occurrence of an indirect supply fault abnormality can be detected quickly.

As can be obvious from the description above, the power feeding control methods of an in-vehicle electronic control unit according to the third embodiment and the fourth embodiment of the invention are the power feeding control methods of the in-vehicle electronic control units 100C and 100D, respectively. The in-vehicle electronic control units 100C and 100D include: the load opening and closing elements 150 and 180, respectively, which are connected in series to a part or all of in-vehicle electrical load groups fed with power from the DC power supply 101; the opening and closing command generation units 120C and 120D, respectively, which supply an opening and closing command signal DR2 to the load opening and closing elements 150 and 180, respectively, according to a driving condition of a vehicle; and the power supply units 110C and 110D, respectively, which feed power to the opening and closing command generation units 120C and 120D, respectively, by generating a predetermined stabilizing voltage when fed with power from the DC power supply 101 in response to the manual power supply switch 102 which is now closed, and configured in such a manner that the power supply switch 102 feeds power to the in-vehicle electrical load 103 which is the part or all of the in-vehicle electrical load groups via the reverse connection protective elements 140 and 160, respectively. A gate voltage is applied by the drive transistors 141 and 161, respectively, to the reverse connection protective elements 140 and 160, respectively, which are field-effect transistors including the parasitic diodes 149 and 169, respectively, when the DC power supply 101 is connected in proper polarity so that the reverse connection protective elements 140 and 160, respectively, are driven to close in a direction same as an energization direction of the parasitic diodes 149 and 169, respectively, whereas the reverse connection protective elements 140 and 160 do not conduct current when the DC power supply 101 is connected in reversed polarity by error and when the power supply units 110C and 110D, respectively, stop feeding power.

The opening and closing command generation units 120C and 120D include the RAM memory 121, the non-volatile program memories 122C and 122D, respectively, a non-volatile data memory which is a partial region of the non-volatile program memories 122C and 122D, respectively, or a separate memory connected thereto, and a microprocessor operating in cooperation with the multi-channel A-to-D converter 123. The microprocessor generates a self-hold command signal DR1 once the power supply switch 102 is closed and power is fed from the power supply unit 110C or 110D, so that a power feeding operation by the power supply unit 110C or 110D is maintained even when the power supply switch 102 is opened. The microprocessor periodically monitors whether the power supply switch 102 is still closed. The microprocessor determines that the power supply switch 102 is opened when the input-side voltages VIG of the reverse connection protective elements 140 and 160 are not generated at least while the reverse connection protective elements 140 and 160 are opened and stops the power feeding operation by the power supply units 110C and 110D, respectively by cancelling the self-hold command signal DR1 after a predetermined delay and stand-by period. The microprocessor determines that a supply fault abnormality is occurring due to fault contact between the output wires of the reverse connection protective elements 140 and 160 and the positive-electrode wire of the DC power supply 101 when output-side voltages of the reverse connection protective elements 140 and 160, respectively, are generated but the input-side voltages VIG are not and saves at least abnormality occurrence history information by writing the abnormality occurrence history information in the non-volatile data memory in the delay and stand-by period.

In a case where the microprocessor detects a supply fault abnormality immediately after the power supply switch 102 is interrupted, the microprocessor either cancels the self-hold command signal DR1 after it notifies the abnormality for a predetermined time by extending at least the delay and stand-by period or reads out supply-fault abnormality occurrence history information in the non-volatile data memory at least when the power supply switch 102 is closed again and, in a case where the supply fault abnormality had occurred when the power supply switch 102 was interrupted last time, notifies the abnormality which had occurred.

As has been described, in conjunction with claim 10 of the invention, in a case where a supply fault abnormality is detected after the power supply switch is interrupted, the abnormality is notified by extending the self-hold power feeding period or the abnormality is notified when the power supply switch is switched ON next time. Accordingly, there is a problem that the occurrence of a supply fault abnormality is difficult to defect while the power supply switch is switched ON. However, a supply fault abnormality is detected when the power supply switch is interrupted. Hence, there is a characteristic that not only can a supply fault abnormality be detected easily in a reliable manner, but also maintenance and inspection can be requested by notifying an abnormality in a reliable manner.

In a case where whether or not a supply fault abnormality is occurring is determined by monitoring a voltage across the reverse connection protective element while the power supply switch is closed, the output-side voltage of the reverse connection protective element is not necessary as high as or higher than the input-side voltage when an imperfect supply fault abnormality having a resistance value occurs, and such a supply fault abnormality is difficult to detect. Also, in a case where whether or not an indirect supply fault abnormality is occurring is determined by monitoring a logic level of an output voltage of the load opening and closing element, there is a problem that a supply fault abnormality is not detected while the load opening and closing element is driven to close. Hence, it is immediately after the power supply switch is opened when a supply fault abnormality in the output wire of the reverse connection protective element can be detected in a reliable manner, and an optimal period is a period during which power is fed with a delay by the self-hold command signal.

The input-side voltage VIG is monitored constantly or periodically while the reverse connection protective element 140 or 160 is driven to close, and it is determined that the power supply switch 102 is opened when the input-side voltage VIG is not generated. Signal voltages on an input side and an output side of the reverse connection protective element 140 or 160 are compared relatively with each other constantly or periodically even when the input-side voltage VIG is generated, and the reverse connection protective element 140 or 160 is opened when the input-side voltage VIG is not higher than the output-side voltage to make determinations as follows: it is determined that the power supply switch 102 is closed when the input-side voltage VIG is generated; it is determined that the power supply switch 102 is opened when neither the input-side voltage VIG nor the output-side voltage is generated; and it is determined that the power supply switch 102 is opened but a supply fault abnormality is occurring when the output-side voltage is generated but the input-side voltage VIG is not.

As has been described, in conjunction with claim 12 of the invention, the microprocessor monitors the input-side voltage of the reverse connection protective element while the reverse connection protective element is driven to close. The microprocessor determines that the power supply switch is opened when the input-side voltage is not generated and determines whether the power supply switch is opened or closed and whether or not a supply fault abnormality is occurring by opening the reverse connection protective element when the input-side voltage of the reverse connection protective element is not higher than the output-side voltage. Hence, there is no need to periodically open and close the reverse connection protective element. Because the open and close states of the power supply switch can be detected by constantly closing the reverse connection protective element until a supply fault abnormality occurs, a loss of power accompanying the opening and closing of the reverse connection protective element does not occur during a normal operation. Hence, there is a characteristic that a temperature rise of the reverse connection protective element can be suppressed. Also, even in the case of an imperfect supply fault abnormality, the input-side voltage of the reverse connection protective element becomes lower than the output-side voltage when the power supply switch is opened. Hence, there is a characteristic that when the power supply switch is opened, the opening can be detected immediately.

A plurality of in-vehicle electrical loads, to each of which the load opening and closing element is connected in series, are connected in parallel with the reverse connection protective element 140 or 160 in a lower stream location. The load opening and closing elements 150 and 180, each of which is a field-effect transistor, are connected in series to a particular electrical load 103 among a plurality of the in-vehicle electrical loads in an upper stream location. Open-circuit output voltages of the load opening and closing elements 150 and 180 are monitored each time an opening and closing command signal DR2 for the load opening and closing elements 150 and 180 is changed to an open-circuit command. It is determined that an indirect supply fault abnormality is occurring due to an output wire of the load opening and closing element 150 or 180 coming in fault contact with the positive-electrode wire of the DC power supply 101 when the open-circuit output voltage is generated. When the occurrence of the indirect supply fault abnormality is detected, the load opening and closing element 150 or 180 are forcedly closed until the opening and closing command signal DR2 is changed to the open-circuit command again.

As has been described, in conjunction with claim 13 of the invention, whether or not an indirect supply fault abnormality is occurring in the output wire of the load opening and closing element is determined each time the load opening and closing element is opened. When an indirect supply fault abnormality is detected, the load opening and closing element is forcedly closed until an open-circuit command is generated next time. Hence, there is a characteristic that a temperature rise of the load opening and closing element can be reduced considerably by avoiding power from being fed to another electrical load via the internal parasitic diode in the load opening and closing element in which the indirect supply fault abnormality has occurred and thereby conducting current inversely from the drain terminal to the source terminal in the forcedly closed load opening and closing element.

Various modifications and alterations of this invention will be apparent to those skilled in the art without departing from the scope and spirit of this invention, and it should be understood that this is not limited to the illustrative embodiments set forth herein.

What is claimed is:
1. An in-vehicle electronic control unit, comprising:
a load opening and closing element which is connected in series to an in-vehicle electrical load and controls a power supply from a DC power supply to the in-vehicle electrical load;
an opening and closing command generation unit which supplies an opening and closing command signal to the load opening and closing element, to close the load opening and closing element, and supplies a driving control signal to a gate of a drive transistor, to close the drive transistor;
a reverse connection protective element which has an input wire connected to the DC power supply via a power supply switch and an output wire connected to the in-vehicle electrical load;
a first monitor element which is connected to the input wire of the reverse connection protective element, monitors an input-side voltage on the input wire, and outputs a first monitor signal; and
a power supply unit which feeds power to the opening and closing command generation unit by generating a predetermined stabilizing voltage when fed with the power from the DC power supply in response to the power supply switch being closed,
wherein:
the opening and closing command generation unit generates a self-hold command signal once the power supply switch is closed, to maintain a power feeding operation by the power supply unit when the power supply switch is subsequently opened, by maintaining the self-hold command signal;
the reverse connection protective element includes a first field-effect transistor (FET),
a parasitic diode is formed between a drain and a source of the first FET,
the drive transistor is configured to apply a voltage to a gate of the first FET, in response to receiving the driving control signal, so that the reverse connection protective element is closed and conducts current in a same direction as a conduction direction of the parasitic diode when the DC power supply is connected in a proper polarity, whereas the reverse connection protective element does not conduct the current when the DC power supply is connected in a reversed polarity by an error and when the power supply unit stops the power feeding operation;
the opening and closing command generation unit determines that the power supply switch is opened, in a first cycle, when the input-side voltage is less than a predetermined value based on the first monitor signal, and verifies that the power supply switch is closed, in a second cycle, when the input-side voltage is equal to or higher than the predetermined value by periodically cancelling the driving signal to the drive transistor to open the reverse connection protective element and monitoring the input-side voltage while the reverse connection protective element is opened;
the opening and closing command generation unit stops the power feeding operation of the power supply unit by cancelling the self-hold command signal after a predetermined delay time upon detecting that the power supply switch is opened, and cancels the driving signal to open the drive transistor which opens the reverse connection protective element, so that the power supply unit is not started again while the power supply switch is opened due to the output wire of the reverse connection protective element and a positive-electrode wire of the DC power supply coming into contact with each other in an error.

2. The in-vehicle electronic control unit according to claim 1, wherein:
the opening and closing command generation unit monitors whether the power supply switch is opened or closed in the first cycle having a high frequency, verifies that the power supply switch is closed by periodically opening the reverse connection protective element in the second cycle having a low frequency, and drives the reverse connection protective element to close again immediately in response to determining that the power supply switch is closed, in the second cycle.

3. The in-vehicle electronic control unit according to claim 1, further comprising a second monitor element which is connected to the output wire of the reverse connection protective element, monitors an output-side voltage of the reverse connection protective element, and outputs a second monitor signal,
wherein:
the opening and closing command generation unit receives the second monitor, and
in verifying that the power supply switch is closed, in the second cycle, the opening and closing command generation unit compares values of the first monitor signal and the second monitor signal, and determines that a power supply fault abnormality is occurring when the output-side voltage of the reverse connection protective element is detected but the input-side voltage is not detected.

4. The in-vehicle electronic control unit according to claim 1, wherein:
the reverse connection protective element is controlled to open or close, via the drive transistor, based on one of a voltage value proportional to an output current of the reverse connection protective element, a first difference voltage which a value proportional to a difference between the input-side voltage and an output-side voltage on the output wire of the reverse connection protective element, and a second difference voltage between a voltage value proportional to the input-side voltage and a voltage value proportional to the output-side voltage; and
the reverse connection protective element is controlled to close when the current equal to or higher than a threshold current flows in the conduction direction of the parasitic diode, and the driving signal to the drive transistor is cancelled at least when the input-side voltage is equal to as or lower than the output-side voltage.

5. The in-vehicle electronic control unit according to claim 4, further comprising:
a differential amplifier which has an output terminal connected to the opening and closing command generation unit, and provides an output signal indicating that the DC power supply is connected in the proper polarity when the input-side voltage of the reverse connection protective element exceeds the output-side voltage based on one of a voltage value across the reverse connection protective element, a voltage value across a circuit comprising a series connected current detection resistor and the reverse connection protective element, and a third difference voltage proportional to a voltage across the circuit comprising the series connected current detection resistor and reverse connection protective element; and
the reverse connection protective element is driven to close via the drive transistor when the output signal of the differential amplifier has a value equal to or greater than a predetermined value corresponding to the threshold current.

6. The in-vehicle electronic control unit according to claim 5, wherein:
the differential amplifier has first and second input terminals connected to each other by a pair of clip diodes,
the first input terminal is connected to the output wire of the reverse connection protective element via a first input resistor,
the second input terminal is connected to the input wire of the reverse connection protective element via a second input resistor,
the first and second input resistors are used to measure the third difference voltage,
a leak current interruption element is connected in series between the second input resistor and the input wire of the reverse connection protective element and is connected to the drive transistor, and
the leak current interruption element is closed in response to the driving signal provided to the drive transistor, and is opened in response to the reverse connection protective element being opened.

7. The in-vehicle electronic control unit according to claim 1, further comprising a third monitor which is connected to the load opening and closing element, monitors an output voltage of the load opening and closing element, and outputs a third monitor signal,
wherein:
the load opening and closing element includes a second FET which is connected between the in-vehicle electrical load and the reverse connection protective element;
the opening and closing command generation unit monitors the third monitor signal each time the opening and the closing command generation unit cancels the opening and closing command signal to open the load opening and closing element, and determines that an indirect supply fault abnormality is occurring in response to the third monitor signal indicating that the output voltage of the load opening and closing element is present;
the indirect supply fault abnormality is an abnormality which occurs due to an output wire of the load opening and closing element coming in contact with the positive-electrode wire of the DC power supply by an error; and
the opening and closing command generation unit further cancels the driving signal to the drive transistor to open the reverse connection protective element, in response to upon detection determining that the indirect supply fault abnormality is occurring, to determine whether the power supply switch is opened, and immediately transmits the driving signal to close the reverse connection protective element again in response to determining that the power supply switch is closed.

8. The in-vehicle electronic control unit according to claim 1, further comprising:
a supply fault determination circuit which is connected to an output wire of the load opening and closing element, and determines whether an indirect supply fault abnormality is occurring, which is an abnormality occurring due to the output wire of the load opening and closing element coming in contact with the positive-electrode wire of the DC power supply by an error, by monitoring the output voltage on the output wire of the load opening and closing element each time the opening and closing command signal for the load opening and closing element is cancelled,
wherein:

the load opening and closing element includes a second FET which is connected between the in-vehicle electrical load and the reverse connection protective element lower stream location, and the opening and closing command generation unit cancels the driving signal to the drive transistor to open for the reverse connection protective element, in response to determining, by the supply fault determination circuit, the indirect supply fault abnormality, to determine whether the power supply switch is opened, and immediately transmits the driving signal to close the reverse connection protective element again is response to determining that.

9. A power feeding control method of an in-vehicle electronic control unit including: a load opening and closing element which is connected in series to an in-vehicle electrical load and controls a power supply from a DC power supply to the in-vehicle electrical load, an opening and closing command generation unit including a microprocessor which supplies an opening and closing command signal to the load opening and closing element, to close the load opening and closing element, and supplies a driving control signal to a gate of a drive transistor, to close the drive transistor, a reverse connection protective element which has an input wire connected to the DC power supply via a power supply switch and an output wire connected to the in-vehicle electrical load, and a power supply unit which feeds power to the opening and closing command generation unit by generating a predetermined stabilizing voltage when fed with the power from the DC power supply in response to the power supply switch being closed, the method comprising:

applying a gate voltage, by the drive transistor, to the reverse connection protective element which includes a first field-effect transistor (FET) including a parasitic diode, so that the reverse connection protective element is closed and conducts current in a same direction as a conduction direction of the parasitic diode when the DC power supply is connected in a proper polarity, whereas the reverse connection protective element does not conduct the current when the DC power supply is connected in a reversed polarity by an error and when the power supply unit stops a power feeding operation;

generating, by the microprocessor, a self-hold command signal once the power supply switch is closed, to maintain the power feeding operation by the power supply unit when the power supply switch is subsequently opened, by maintaining the self-hold command signal;

periodically monitoring, by the microprocessor, whether the power supply switch is still closed;

determining, by the microprocessor, that the power supply switch is opened when an input-side voltage of the reverse connection protective element is not generated and stopping the power feeding operation by cancelling the self-hold command signal after a predetermined delay and stand-by period; and determining, by the microprocessor, that a supply fault abnormality is occurring due the output wire of the reverse connection protective element and a positive-electrode wire of the DC power supply coming into contact with each other by an error, when an output-side voltage of the reverse connection protective element is generated but the input-side voltage is not generated, and saving abnormality occurrence history information in a non-volatile data memory in the delay and stand-by period.

10. The power feeding control method of an in-vehicle electronic control unit according to claim 9, wherein:

in a case where the microprocessor detects the supply fault abnormality immediately after the power supply switch is opened, the microprocessor is configured to;

cancel the self-hold command signal after the microprocessor notifies about the supply fault abnormality for a predetermined time by extending at least the delay and stand-by period; and read out the abnormality occurrence history information in the non-volatile data memory when the power supply switch is closed again and, in a case where the supply fault abnormality had occurred when the power supply switch was opened last time, notifies about the supply fault abnormality which had occurred.

11. The power feeding control method of an in-vehicle electronic control unit according to claim 9, further comprising:

monitoring the input-side voltage of the reverse connection protective element with a high frequency equal to or less than a first cycle T1 while the reverse connection protective element is closed and determining that the power supply switch is opened when the input-side voltage of the reverse connection protective element is not generated; and when it is determined that the input-side voltage of the reverse connection protective element is generated, periodically opening the reverse connection protective element with a low frequency equal to or less frequent than a second cycle T (T2>T1), and determining that the power supply, switch is opened; and wherein the reverse connection protective element is opened in a time zone within a period of the second cycle T2 which is a period within the first cycle T1.

12. The power feeding control method of an in-vehicle electronic control unit according to claim 9, further comprising:

monitoring the input-side voltage of the reverse connection protective element while the reverse connection protective element is closed, and determining that the power supply switch is opened when the input-side voltage is not generated; and comparing signal voltages on an input side and an output side of the reverse connection protective element with each other in one of a constant manner and a when the input-side voltage is generated, and opening the reverse connection protective element when the input-side voltage is not higher than the output-side voltage to perform steps comprising:

determining that the power supply switch is closed when the input-side voltage is generated, determining that the power supply switch is opened when neither the input-side voltage nor the output-side voltage is generated, and determining that the power supply switch is opened and the supply fault abnormality is occurring when the output-side voltage is generated but the input-side voltage is not generated.

13. The power feeding control method of an in-vehicle electronic control unit according to claim 9, wherein the load opening and closing element includes a second FET connected in series to the in-vehicle electrical load, and the method further comprises:

monitoring an open-circuit output voltage of the load opening and closing element each time the opening and closing command signal for the load opening and closing element is changed to an open-circuit command;

determining that an indirect supply fault abnormality is occurring due to an output wire of the load opening and closing element coming in contact with the positive-electrode wire of the DC power supply by an error, when the open-circuit output voltage is generated; and when it is determined that the indirect supply fault abnormality is occurring, maintaining the load opening and closing element closed until the opening and closing command signal is changed to the open-circuit command again.

* * * * *